United States Patent
Kobayashi

(10) Patent No.: US 11,358,281 B2
(45) Date of Patent: Jun. 14, 2022

(54) CONTROL METHOD BY ROBOT SYSTEM AND ROBOT SYSTEM

(71) Applicant: Seiko Epson Corporation, Tokyo (JP)

(72) Inventor: Reiji Kobayashi, Matsumoto (JP)

(73) Assignee: Seiko Epson Corporation

( * ) Notice: Subject to any disclaimer, the term of this patent is extended or adjusted under 35 U.S.C. 154(b) by 235 days.

(21) Appl. No.: 16/857,224

(22) Filed: Apr. 24, 2020

(65) Prior Publication Data

US 2020/0338740 A1 Oct. 29, 2020

(30) Foreign Application Priority Data

Apr. 25, 2019 (JP) .............................. JP2019-083765

(51) Int. Cl.
*B25J 9/16* (2006.01)
*B25J 9/00* (2006.01)

(52) U.S. Cl.
CPC ........... *B25J 9/1689* (2013.01); *B25J 9/0084* (2013.01)

(58) Field of Classification Search
CPC ...... B25J 9/1689; B25J 9/0084; B25J 13/006; B25J 9/1682; B25J 9/1602; B25J 9/1664
USPC ................................................. 700/245–264
See application file for complete search history.

(56) References Cited

U.S. PATENT DOCUMENTS

| | | | | |
|---|---|---|---|---|
| 4,700,118 A * | 10/1987 | Kishi | ...................... | B25J 9/1692 318/368 |
| 5,555,179 A * | 9/1996 | Koyama | .......... | G05B 19/41835 700/95 |
| 5,648,897 A * | 7/1997 | Johnson | ............... | G05D 1/0246 700/83 |
| 5,862,056 A * | 1/1999 | Iwata | .................. | G05B 19/4068 700/184 |
| 6,167,464 A * | 12/2000 | Kretschmann | .......... | H04L 67/36 710/73 |
| 6,330,493 B1* | 12/2001 | Takahashi | .............. | B25J 9/1682 700/250 |
| 6,330,495 B1* | 12/2001 | Kaneko | .................. | B25J 9/1671 700/264 |

(Continued)

FOREIGN PATENT DOCUMENTS

| JP | 2010-131705 A | 6/2010 |
|---|---|---|
| JP | 2011-067894 A | 4/2011 |
| JP | 2017-013153 A | 1/2017 |

*Primary Examiner* — Jaime Figueroa
(74) *Attorney, Agent, or Firm* — Harness, Dickey & Pierce, P.L.C.

(57) ABSTRACT

In a control method by a robot system, in the robot system including a plurality of robots and a teaching device connected to the plurality of robots via a network, the teaching device transmits, to an identification act execution robot among the plurality of robots, an identification act instruction signal for causing the identification act execution robot to perform an identification act of identifying a transmission target robot to which operation data is planned to be transmitted among the plurality of robots, the identification act execution robot, which receives the identification act instruction signal, performs the identification act, and, after the identification act execution robot performs the identification act, when the identification act execution robot and the transmission target robot are the same, the teaching device transmits the operation data to the transmission target robot.

8 Claims, 16 Drawing Sheets

(56) References Cited

U.S. PATENT DOCUMENTS

| | | | | |
|---|---|---|---|---|
| 6,442,451 B1* | 8/2002 | Lapham | B25J 9/1656 | 901/8 |
| 6,560,513 B2* | 5/2003 | Krause | G05B 19/0426 | 318/568.22 |
| 6,717,382 B2* | 4/2004 | Graiger | H04B 5/0043 | 318/568.25 |
| 7,069,112 B2* | 6/2006 | Graf | B25J 9/1682 | 700/254 |
| 7,451,016 B2* | 11/2008 | Johannessen | B25J 13/06 | 318/567 |
| 7,525,274 B2* | 4/2009 | Kazi | G05B 19/4185 | 318/587 |
| 7,778,729 B2* | 8/2010 | Kobayashi | B25J 9/16 | 318/568.14 |
| 7,783,387 B2* | 8/2010 | Calcagno | G05B 19/42 | 700/20 |
| 7,957,838 B2* | 6/2011 | Poljen | B25J 13/065 | 318/568.14 |
| 9,943,964 B2* | 4/2018 | Hares | A61B 34/32 | |
| 10,702,987 B2* | 7/2020 | Matsudaira | G05B 19/409 | |
| 10,981,273 B2* | 4/2021 | Chang | B25J 9/1656 | |
| 11,110,606 B2* | 9/2021 | Pedigo | B25J 9/0084 | |
| 2004/0133312 A1* | 7/2004 | Watanabe | B25J 13/003 | 700/264 |
| 2004/0148058 A1* | 7/2004 | Johannessen | B25J 13/06 | 700/245 |
| 2004/0260426 A1* | 12/2004 | Johannessen | B25J 13/06 | 700/245 |
| 2007/0093939 A1* | 4/2007 | Kobayashi | G05B 19/4185 | 700/245 |
| 2008/0065243 A1* | 3/2008 | Fallman | G05B 23/0267 | 700/83 |
| 2009/0299524 A1* | 12/2009 | Evans | B25J 9/1656 | 700/248 |
| 2018/0071913 A1* | 3/2018 | Matsudaira | G05B 19/409 | |
| 2019/0121335 A1* | 4/2019 | Yoneda | G05B 19/4185 | |
| 2019/0176332 A1* | 6/2019 | Galloway | G05B 19/4185 | |
| 2019/0221037 A1* | 7/2019 | Sugaya | G06T 13/20 | |
| 2019/0299402 A1* | 10/2019 | Chang | G05B 19/423 | |

* cited by examiner

FIG. 3

IDENTIFICATION ACT DATA ⟨36

☐ NO. 1 MACHINE

FLASHING INTERVAL:0.5 SECOND    MODEL:RSE372

DISPOSITION PLACE:FIRST

☐ NO. 2 MACHINE

FLASHING INTERVAL:1.0 SECOND    MODEL:RSE372

DISPOSITION PLACE:SECOND

☐ NO. 3 MACHINE

FLASHING INTERVAL:1.5 SECOND    MODEL:RSE372

DISPOSITION PLACE:THIRD

FIG. 4

OPERATION DATA LIST

| | | |
|---|---|---|
| ☐ FIRST OPERATION DATA | | FLASHING PATTERN: |
| OPERATION OVERVIEW: FIRST WORK PICKING | | REPETITION OF 0.5 SECOND AND 0.1 SECOND |
| ☐ SECOND OPERATION DATA | | FLASHING PATTERN: |
| OPERATION OVERVIEW: SECOND WORK PICKING | | REPETITION OF 0.5 SECOND, 0.1 SECOND, AND 0.1 SECOND |
| ☐ THIRD OPERATION DATA | | FLASHING PATTERN: |
| OPERATION OVERVIEW: COMPONENT A AND COMPONENT B ASSEMBLING | | REPETITION OF 0.5 SECOND, 0.1 SECOND, 0.1 SECOND, AND 0.1 SECOND |
| ☐ FOURTH OPERATION DATA | | FLASHING PATTERN: |
| OPERATION OVERVIEW: ARRAYING WORK | | REPETITION OF 0.5 SECOND AND 0.3 SECOND |
| ☐ FIFTH OPERATION DATA | | FLASHING PATTERN: |
| OPERATION OVERVIEW:COMPONENT C AND COMPONENT D ASSEMBLING | | REPETITION OF 0.5 SECOND, 0.3 SECOND, AND 0.3 SECOND |

*FIG. 5*

OPERATION DATA

☐ FIRST OPERATION DATA (1) FLASHING PATTERN: REPETITION OF 0.5 SECOND AND 0.1 SECOND (2) MOVING PROCEDURE DATA

1. MOVE TO POINT 1
2. STOP FOR 0.5 SECOND
3. MOVE TO POINT 2
4. OPEN END EFFECTOR
5. STOP FOR 2 SECONDS
6. CLOSE END EFFECTOR
7. MOVE TO POINT 3
8. MOVE TO POINT 4
9. MOVE TO POINT 1
10. STOP UNTIL MOVING INSTRUCTION IS GIVEN (3) POINT DATA

POINT 1  X:59.33524  Y:123.66581  Z:263.22354

POINT 2  X:61.26487  Y:135.85987  Z:259.33568

POINT 3  X:60.63634  Y:114.98741  Z:272.68462

POINT 4  X:57.55824  Y:129.65487  Z:242.69248

FIG. 6

```
                                                              ┌─38
┌──────────────────────────────────────────────────────────────┐
│         ROBOT AND OPERATION DATA CORRESPONDENCE DATA         │
│                                                              │
│    ROBOT NAME              │    OPERATION DATA NAME          │
│  ─────────────────────────────────────────────────────────   │
│                            │ ☐  FIRST OPERATION DATA         │
│                            │ ☐  SECOND OPERATION DATA        │
│   NO. 1 MACHINE  ☐         │ ☐  THIRD OPERATION DATA         │
│   NO. 2 MACHINE  ☐         │ ☐  FOURTH OPERATION DATA        │
│   NO. 3 MACHINE  ☐         │ ☐  FIFTH OPERATION DATA         │
│                            │ ☐  SIXTH OPERATION DATA         │
│                            │ ☐  SEVENTH OPERATION DATA       │
│                            │ ☐  EIGHTH OPERATION DATA        │
│                            │ ☐  NINTH OPERATION DATA         │
└──────────────────────────────────────────────────────────────┘
```

CONTROL METHOD BY ROBOT SYSTEM AND ROBOT SYSTEM

The present application is based on, and claims priority from JP Application Serial Number 2019-083765, filed Apr. 25, 2019, the disclosure of which is hereby incorporated by reference herein in its entirety.

BACKGROUND

1. Technical Field

The present disclosure relates to a control method by a robot system and the robot system.

2. Related Art

Preparation work for setting moving points of arms and moving procedures for the arms is necessary before operating a robot. The preparation work is performed using a teaching device. JP-A-2011-067894 (Patent Literature 1) discloses a method of performing preparation work for a plurality of robots with one teaching device by performing communication between the robots and the teaching device via a network. According to Patent Literature 1, a teaching pendant functioning as the teaching device and the plurality of robots are coupled by a wireless LAN (Local Area Network).

The robots include display lamps. An operator operates the teaching device and transmits a connection request signal to a robot that communicates with the teaching device. When the robot, which receives the connection request signal, is communicatively connectable, the robot lights the display lamp. In this way, the display lamp of the robot, with which the teaching device communicates, is lit and the display lamp of the robot, with which the teaching device does not communicate, is extinguished. Therefore, the operator can confirm which robot is operated by the teaching device. The operator operates the teaching device to thereby operate the plurality of robots and set moving points of the arms and moving procedures for the arms.

The teaching device includes a storage device. Operation data indicating a plurality of operation patterns of the robots is stored in the storage device. The operation patterns of the robots are changed by rewriting the operation data. The robots perform unexpected operation when wrong operation data is transmitted to the robots. For example, in a state in which a first robot and a second robot are disposed, when operation data of the second robot is transmitted to the first robot by mistake, the first robot performs movement that the second robot is planned to perform. A robot arm of the first robot is likely to hit and damage a jig, a device, a workpiece, and a structure for performing work.

When the operator communicates with a specific robot among the plurality of robots, there has been no means for identifying with which robot the operator has communicated. As a result, the operator is likely to erroneously transmit operation data to a robot to which the operation data is not planned to be transmitted.

SUMMARY

A control method by a robot system according to an aspect of the present disclosure is a control method by a robot system including a plurality of robots and a teaching device connected to the plurality of robots via a network. The teaching device transmits, to an identification act execution robot among the plurality of robots, an identification act instruction signal for causing the identification act execution robot to perform an identification act of identifying a transmission target robot to which operation data is planned to be transmitted among the plurality of robots; the identification act execution robot, which receives the identification act instruction signal, performs the identification act; and, after the identification act execution robot performs the identification act, when the identification act execution robot and the transmission target robot are the same, the teaching device transmits the operation data to the transmission target robot.

In the control method by the robot system, the teaching device may further transmit an operation data clear indication instruction signal indicating the operation data to the identification act execution robot, and the identification act execution robot, which receives the operation data clear indication instruction signal, may further perform, an operation data clear indication act based on the operation data clear indication instruction signal.

In the control method by the robot system, light may be emitted from the identification act execution robot in the identification act.

A robot system according to an aspect of the present disclosure is a robot system that performs data transmission and reception between a plurality of robots and a teaching device connected to the plurality of robots via a network. The teaching device includes: a display section configured to display identification act data indicating an identification act of identifying a transmission target robot to which operation data is planned to be transmitted among the plurality of robots and the operation data indicating operation content of the robot; and a transmitting section configured to transmit, to an identification act execution robot among the plurality of robots, an identification act instruction signal for causing the identification act execution robot to perform the identification act and transmit the operation data to the transmission target robot. The robot includes: a receiving section configured to receive the identification act instruction signal and the operation data; and an identification act section configured to perform the identification act when the receiving section receives the identification act instruction signal.

In the robot system, the robot may include an operation clear indication act section configured to perform an operation data clear indication act of indicating the operation data, the transmitting section may further transmit an operation data clear indication instruction signal indicating the operation data to the identification act execution robot, the receiving section may receive the operation data clear indication instruction signal, and the operation clear indication act section may perform the operation data clear indication act.

In the robot system, the identification act section may emit light in the identification act.

BRIEF DESCRIPTION OF THE DRAWINGS

FIG. 3 is a schematic diagram for explaining identification act data.

FIG. 4 is a schematic diagram for explaining an operation data list.

FIG. 5 is a schematic diagram for explaining operation data.

FIG. 6 is a schematic diagram for explaining robot and operation data correspondence data.

DESCRIPTION OF EXEMPLARY EMBODIMENTS

Figure 1:
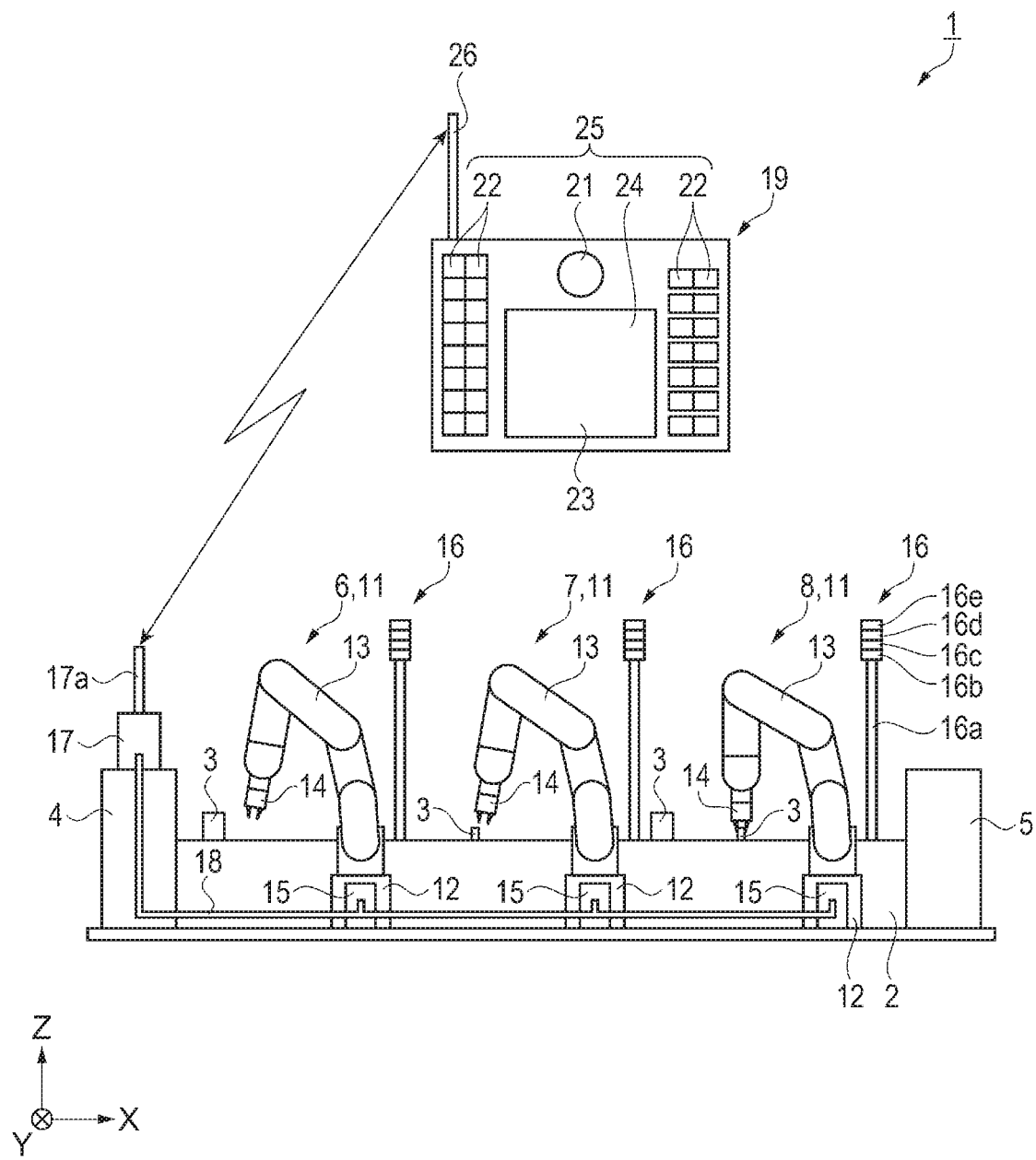
FIG. 1 is a schematic side view for explaining a setting example of a robot system according to a first embodiment.

Embodiments are explained below with reference to the drawings. In the drawings, scales of members are differentiated for each of the members in order to show the members in recognizable sizes on the drawings.

First Embodiment

In a first embodiment, characteristic examples of a robot system and a control method by the robot system performed in the robot system are explained with reference to the figures. The robot system and the control method by the robot system according to the first embodiment are explained with reference to FIGS. 1 to 17. FIG. 1 is a schematic side view for explaining a setting example of the robot system. In FIG. 1, a direction from the left side toward the right side in the figure is represented as a +X direction and the opposite direction of the +X direction is represented as a −X direction. A direction from the lower side toward the upper side in the figure is represented as a +Z direction and the opposite direction of the +Z direction is represented as a −Z direction. A direction from the near side toward the depth side of the paper surface is represented as a +Y direction and the opposite direction of the +Y direction is represented as a −Y direction.

A robot system 1 includes a belt conveyor 2. The belt conveyor 2 is formed in a shape long in the +X direction. Work 3 is placed on the belt conveyor 2. The work 3 is a component configuring a product or a structure to which machining is applied. The belt conveyor 2 is an apparatus that rotates a ring-shaped wide belt and places an object such as the work 3 on the belt and moves the object. A material supplying apparatus 4 is disposed on the −X-direction side of the belt conveyor 2. A material removing apparatus 5 is disposed on the +X direction side of the belt conveyor 2.

A large number of works 3 are stored in the material supplying apparatus 4. The material supplying apparatus 4 supplies the work 3 onto the belt conveyor 2. The belt conveyor 2 moves the supplied work 3 in the +X direction. The work 3 reaching the material removing apparatus 5 is stored in the material removing apparatus 5.

The robot system 1 includes three robots 11, that is, a first robot 6, a second robot 7, and a third robot 8. The number of the robots 11 is not limited to three and only has to be plural. The first robot 6, the second robot 7, and the third robot 8 are disposed side by side in this order from the material supplying apparatus 4 toward the material removing apparatus 5. The type of the robots 11 is not particularly limited. However, in this embodiment, the robots 11 are, for example, six-axis robots.

Each of the robots 11 includes a base 12 fixed to a floor and a plurality of arms 13 turnably coupled to the base 12. An end effector 14 is disposed at the distal end of the arms 13. The end effector 14 includes open-closable four finger sections and can grip the work 3 and tools. The robot 11 includes a control device 15 that controls driving of the arms 13 and the end effector 14. The number of finger sections of the end effector 14 is not limited to four and only has to be plural.

Each of the robots 11 includes a display lamp unit 16. The display lamp unit 16 includes a column 16a long in the Z direction. An operation display light 16b, an abnormality display light 16c functioning as an abnormality notifying section, an identification display light 16d functioning as an identification act section, and an operation-data display light 16e functioning as an operation clear indication act section are disposed side by side in this order on the +Z-direction side of the column 16a. The operation display light 16b is a display lamp indicating whether the robot 11 is operating or is stopped. The operation display light 16b is lit when the robot 11 is operating. The operation display light 16b is extinguished when the robot 11 is stopped.

The abnormality display light 16c is a display lamp indicating whether the robot 11 is in a normal state or an abnormal state. The normal state is a state in which the robot 11 is operating according to a program. For example, the abnormal state includes a state in which the robot 11 becomes uncontrollable and is stopped. The abnormality display light 16c is lit when the robot 11 is in the abnormal state. The abnormality display light 16c is extinguished when the robot 11 is in the normal state. Besides, the abnormality display light 16c is also lit when there is abnormality in a signal transmitted to the robot 11 by a teaching device 19. The identification display light 16d and the operation-data display light 16e are display lamps used during data communication.

A wireless LAN master set 17 (Local Area Network) is disposed on the +Z-direction side of the material supplying apparatus 4. The wireless LAN master set 17 and the three robots 11 are respectively coupled by a LAN cable 18. The wireless LAN master set 17 includes a master set antenna 17a and performs wireless communication to perform transmission and reception of data.

The robot system 1 includes the teaching device 19. The teaching device 19 is called teaching pendant as well. An emergency stop button 21 and various operation buttons 22 are disposed in the teaching device 19. Besides, a display section 23 is disposed in the teaching device 19. The display section 23 is configured by a display device such as an LCD (Liquid Crystal Display). Various kinds of information for operating the robot 11 are displayed on the display section 23. The teaching device 19 is not limited to the teaching pendant and only has to be a device such as a PC or a tablet that can include the various operation buttons 22 and the display section 23.

A touch pad 24 on which transparent electrodes are arranged in a lattice shape is disposed on the surface of the display section 23. When the operator touches the touch pad 24, data in a touched place is input. A touch panel is configured by the display section 23 and the touch pad 24. An input section 25 is configured by the emergency stop button 21, the operation buttons 22, the touch pad 24, and the like.

The teaching device 19 includes a slave set antenna 26. Wireless communication is performed between the slave set antenna 26 and the master set antenna 17a. When the operator operates the teaching device 19, information corresponding to content of the operation is transmitted to the robots 11 via the wireless LAN master set 17 and the LAN cable 18. In this way, the teaching device 19 is connected to the three robots 11 via a network. In the robot system 1, data transmission and reception is performed between a plurality of robots 11 and the teaching device 19. The robot system 1 includes the plurality of robots 11 and the teaching device 19 connected to the plurality of robots 11 via the network.

Figure 2:
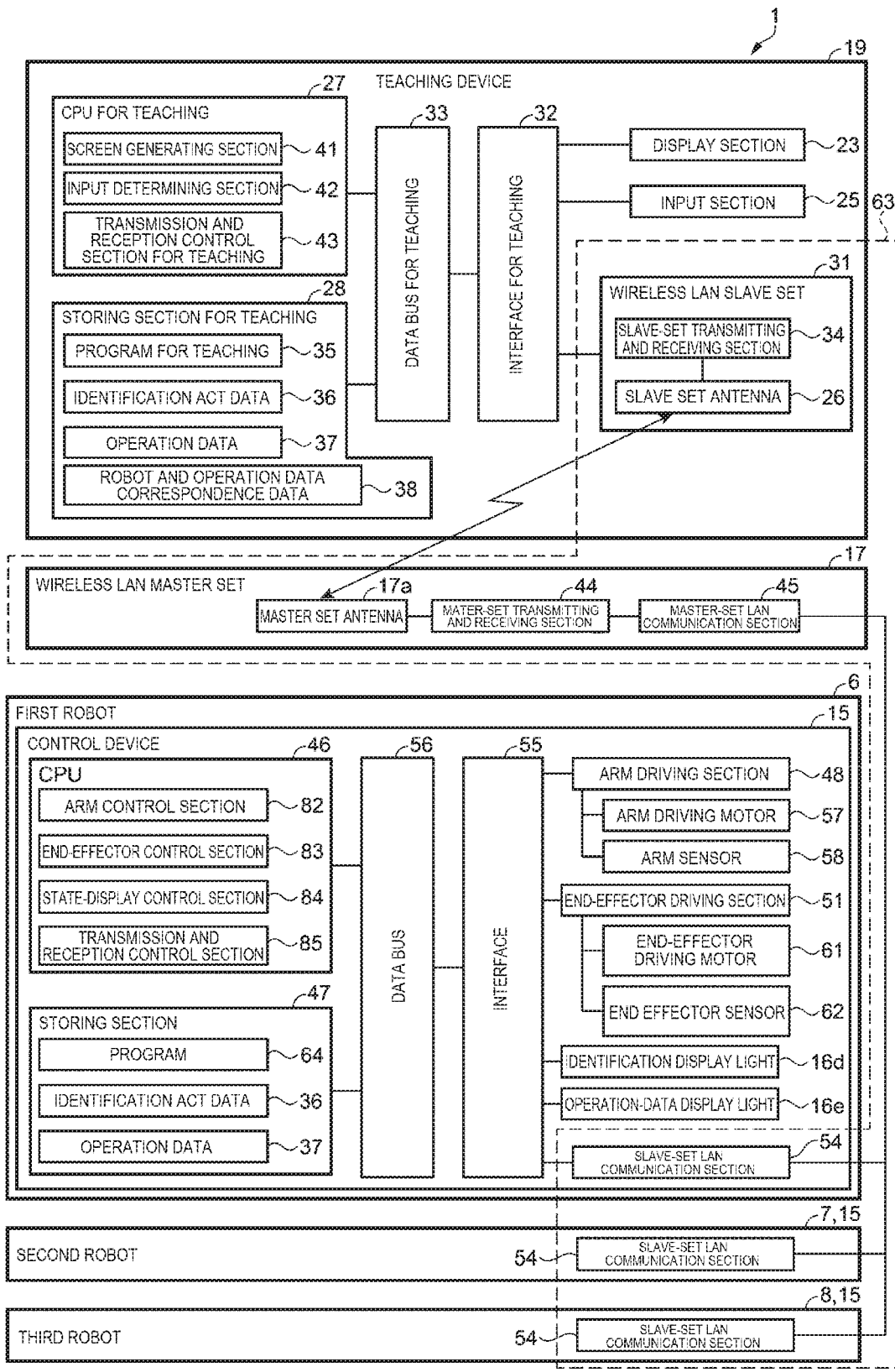
FIG. 2 is an electric control block diagram of the robot system.

FIG. 2 is an electric control block diagram of the robot system. As shown in FIG. 2, the robot system 1 includes the teaching device 19, the wireless LAN master set 17, the first robot 6, the second robot 7, and the third robot 8. The first robot 6, the second robot 7, and the third robot 8 respectively include control devices 15. The control devices 15 of the second robot 7 and the third robot 8 are the same as the control device 15 of the first robot 6. The control device 15 of the first robot 6 is explained. Explanation of the control devices 15 of the second robot 7 and the third robot 8 is omitted.

The teaching device 19 includes a CPU for teaching 27 (a central processing unit) that performs various kinds of arithmetic processing and a storing section for teaching 28 that stores various kinds of information. The display section 23, the input section 25, and a wireless LAN slave set 31 functioning as a transmitting section are coupled to the CPU for teaching 27 via an interface for teaching 32 and a data bus for teaching 33.

The wireless LAN slave set 31 includes a slave-set transmitting and receiving section 34 and the slave set antenna 26. The slave-set transmitting and receiving section 34 converts digital-format information to be transmitted into an analog-format electric signal. Further, the slave-set transmitting and receiving section 34 modulates the analog-format electric signal and transmits the modulated electric signal to the slave set antenna 26. The slave set antenna 26 converts the modulated electric signal into a radio wave and transmits the radio wave to the wireless LAN master set 17.

The slave set antenna 26 receives the radio wave transmitted by the wireless LAN master set 17. The slave set antenna 26 transmits the analog-format electric signal to the slave-set transmitting and receiving section 34. The slave-set transmitting and receiving section 34 demodulates the analog-format electric signal and further converts the modulated electric signal into digital-format information. The slave-set transmitting and receiving section 34 transmits the digital-format information to the CPU for teaching 27.

The storing section for teaching 28 is configured by a semiconductor memory such as a RAM (Random Access Memory) or a ROM (Read Only Memory). The storing section for teaching 28 stores a program for teaching 35 in which a teaching procedure for the operation of the robot 11 and a transmission procedure for operation data 37 are described. Besides, the storing section for teaching 28 stores identification act data 36. The identification act data 36 is data indicating an identification act of identifying the robot 11. An act performed by the operator in order to identify a transmission target robot to which the operation data 37 is planned to be transmitted among the plurality of robots 11 is the identification act.

The display section 23 displays the identification act data 36 indicating an identification act of identifying the transmission target robot 11 to which the operation data 37 is planned to be transmitted among the plurality of robots 11 and the operation data 37 indicating operation content of the robot 11.

Specifically, the identification act data 36 is data transmitted to the communicating robot 11 and indicating a lighting pattern for lighting the identification display light 16d. The operator views the lighting pattern for lighting the identification display light 16d and confirms the communicating robot 11. Besides, the storing section for teaching 28 stores the operation data 37. The operation data 37 is data indicating operation content of the robots 11. Besides, the storing section for teaching 28 stores robot and operation data correspondence data 38. The robot and operation data correspondence data 38 is data indicating correspondence between the robots 11 and the operation data 37. Besides, the storing section for teaching 28 includes storage regions functioning as a work area, a temporary file, and the like for the CPU for teaching 27 to operate and other various storage regions.

The CPU for teaching 27 drives the teaching device 19 according to the program for teaching 35 stored in the storing section for teaching 28. The CPU for teaching 27 transmits the operation data 37 to the robot 11. The CPU for teaching 27, in which the program for teaching 35 operates, includes a screen generating section 41 as a specific function realizing section. The screen generating section 41 forms a screen displayed on the display section 23.

Besides, the CPU for teaching 27 includes an input determining section 42. The operator views the display section 23 and operates the input section 25. The operator inputs an instruction for responding to the screen displayed on the display section 23 to the input section 25. The input determining section 42 determines, from content input to the input section 25, whether the operation data 37 is transmitted to the robot 11.

Besides, the CPU for teaching 27 includes a transmission and reception control section for teaching 43 functioning as a transmission control section. When the input determining section 42 determines that the operation data 37 is transmitted to the robot 11, the transmission and reception control section for teaching 43 transmits the operation data 37 to the communicating robot 11.

The wireless LAN master set 17 includes a master-set transmitting and receiving section 44 and a master-set LAN communication section 45 besides the master set antenna 17a. The master set antenna 17a receives a radio wave transmitted by the wireless LAN slave set 31. The master set antenna 17a converts the radio wave into an analog-format electric signal and transmits the analog-format electric signal to the master-set transmitting and receiving section 44. The master-set transmitting and receiving section 44 demodulates the analog-format electric signal and further converts the modulated electric signal into digital-format information. The master-set transmitting and receiving section 44 transmits the digital-format information to the master-set LAN communication section 45. The master-set LAN communication section 45 transmits the digital-format information to the first robot 6, the second robot 7, or the third robot 8.

Further, the master-set LAN communication section 45 receives digital-format information transmitted by the first robot 6, the second robot 7, or the third robot 8. The master-set LAN communication section 45 transmits the received digital-format information to the master-set transmitting and receiving section 44. The master-set transmitting and receiving section 44 receives the digital-format information and converts the digital-format information into an analog-format electric signal. Further, the master-set transmitting and receiving section 44 modulates the analog-format electric signal and transmits the modulated electric signal to the master set antenna 17a. The master set antenna 17a converts the modulated electric signal into a radio wave and transmits the radio wave to the wireless LAN slave set 31.

The first robot 6 includes the control device 15. The control device 15 includes a CPU 46 that performs various kinds of arithmetic processing and a storing section 47 that stores various kinds of information. An arm driving section 48, an end-effector driving section 51, the identification display light 16d, the operation-data display light 16e, and a slave-set LAN communication section 54 functioning as a receiving section are coupled to the CPU 46 via an interface 55 and a data bus 56.

An arm driving motor 57 and an arm sensor 58 are electrically coupled to the arm driving section 48. The arm driving motor 57 is a motor that rotates joints among the arms 13. The arm sensor 58 is a sensor that detects a relative angle of the arm 13. The arm driving motors 57 and the arm sensors 58 are respectively disposed in the arm 13. The arm driving section 48 drives the arm driving motor 57. Further, the arm driving section 48 transmits an output of the arm sensor 58 to the CPU 46.

An end-effector driving motor 61 and an end effector sensor 62 are electrically coupled to the end-effector driving section 51. The end-effector driving motor 61 is a motor that drives the end effector 14. The end effector sensor 62 is a sensor that detects a movement of the end effector 14. The end-effector driving motor 61 and the end effector sensor 62 are disposed in the end effector 14. The end-effector driving section 51 drives the end-effector driving motor 61. Further, the end-effector driving section 51 transmits an output of the end effector sensor 62 to the CPU 46.

The identification display light 16d flashes in response to information of identification act data transmitted by the teaching device 19. The operation-data display light 16e flashes in response to information of operation data transmitted by the teaching device 19. The identification display light 16d and the operation-data display light 16e are lit or extinguished according to an instruction of the CPU 46.

The slave-set LAN communication section 54 is disposed in the robot 11. The slave-set LAN communication section 54 communicates with the master-set LAN communication section 45. A network 63 is formed by the slave-set LAN communication section 54, the wireless LAN master set 17, and the wireless LAN slave set 31.

The storing section 47 is configured by a semiconductor memory such as a RAM or a ROM. The storing section 47 stores a program 64 for moving the arms 13 and the end effector 14 according to the operation data 37 of the robot 11. In other words, the storing section 47 stores the program 64 for at least one robot 11 among the first robot 6, the second robot 7, and the third robot 8. Besides, the storing section 47 stores the identification act data 36 and the operation data 37 like the storing section for teaching 28. Besides, the storing section 47 includes storage regions functioning as a work area, a temporary file, and the like for the CPU 46 to operate and other various storage regions.

The CPU 46 drives the first robot 6 according to the program 64 stored in the storing section 47. The CPU 46 controls the operation of the first robot 6 according to the identification act data 36 and the operation data 37.

The CPU 46, in which the program 64 operates, includes an arm control section 82 as a specific function realizing section. The arm control section 82 outputs an instruction signal for moving the arms 13 according to the operation data 37 to the arm driving section 48. Besides, the CPU 46 includes an end-effector control section 83. The end-effector control section 83 outputs an instruction signal for moving the end effector 14 according to the operation data 37 to the end-effector driving section 51.

Besides, the CPU 46 includes a state-display control section 84. The state-display control section 84 flashes the identification display light 16d when receiving an identification act instruction signal. Further, the state-display control section 84 flashes the operation-data display light 16e when receiving an operation data clear indication instruction signal. The operation data clear indication instruction signal is a signal indicating the operation data 37. Besides, the CPU 46 includes a transmission and reception control section 85. The transmission and reception control section 85 drives the slave-set LAN communication section 54 and controls communication with the teaching device 19.

FIG. 3 is a schematic diagram for explaining the identification act data. As shown in FIG. 3, data of the robots 11 included in the robot system 1 is stored in the identification act data 36. The robot system 1 includes the first robot 6, the second robot 7, and the third robot 8. Since the three robots 11 are disposed, data of the three robots 11 are stored in the identification act data 36.

Data of a robot name, a flashing interval, a model of a robot, and a disposition place of the robot are included in items of the identification act data 36. Robot names of the first robot 6, the second robot 7, and the third robot 8 are respectively "No. 1 machine", "No. 2 machine", and "No. 3 machine". When the teaching device 19 performs communication with the first robot 6, the first robot 6 performs an identification act of indicating the first robot 6. The identification act is an act of flashing the identification display light 16d. In the flashing interval, a different interval is set for each of the robots 11. The operator views the flashing interval of the identification display light 16d and confirms the position of the first robot 6. In this way, the identification act data 36 indicates the identification act of identifying the robot 11.

The identification act data 36 includes first identification act data, second identification act data, and third identification act data. The first identification act data indicates an identification act of identifying the first robot 6. The second identification act data indicates an identification act of identifying the second robot 7. The third identification act data indicates an identification act of identifying the third robot 8.

In this embodiment, for example, the flashing interval is 0.5 second in the first identification act data. A first identification act, which is an identification act performed by the first robot 6, is an act of flashing the identification display light 16*d* at an interval of 0.5 second. In the second identification act data, the flashing interval is 1.0 second. A second identification act, which is an identification act performed by the second robot 7, is an act of flashing the identification display light 16*d* at an interval of 1.0 second. In the third identification act data, the flashing interval is 1.5 seconds. A third identification act, which is an identification act performed by the third robot 8, is an act of flashing the identification display light 16*d* at an interval of 1.5 seconds. In this way, the identification acts include the first identification act, the second identification act, and the third identification act.

Models of the first robot 6 to the third robot 8 are "RSE372". Disposition places of the first robot 6 to the third robot 8 are respectively "first", "second", and "third". The item of the disposition place indicates order of disposition of the robot 11 counted from the −X-direction side. The identification act data 36 is displayed on the display section 23 of the teaching device 19. The operator views the display section 23 and confirms the identification act data 36. The operator operates the input section 25 and changes the identification act data 36.

FIG. 4 is a schematic diagram for explaining an operation data list. As shown in FIG. 4, operation data includes a plurality of data including first operation data and second operation data. A list of identification names of the operation data is shown in the operation data list. In FIG. 4, identification names of five operation data from first operation data to fifth operation data are shown. The number of operation data is not particularly limited. A data name, an operation overview, and a flashing pattern are shown in the operation data list. A sentence, from which operation content performed by the robot 11 is recalled, is described in the operation overview. For example, operation overview of the first operation data is first work picking. This indicates that operation for gripping the first work is included in the first operation data.

The flashing pattern indicates a pattern of flashing of the operation-data display light 16*e*. A flashing pattern of the first operation data is a pattern of repetition of 0.5 second and 0.1 second. For example, when the teaching device 19 transmits the first operation data to the robot 11 to which the first operation data is transmitted, before the transmission, the robot 11 performs an operation data clear indication act corresponding to the first operation data. The first operation data clear indication act, which is the operation data clear indication act corresponding to the first operation data, is an act of flashing the operation-data display light 16*e* in a flashing pattern of the first operation data. In other words, in the robot 11 to which the first operation data is transmitted, the operation-data display light 16*e* flashes in the flashing pattern of the first operation data. The operator views the flashing pattern of the operation-data display light 16*e* and confirms the robot 11 to which the first operation data is transmitted.

In operation data from second operation data to fifth operation data, a data name, an operation overview, and a flashing pattern are set as in the first operation data. The operation data is displayed on the display section 23 of the teaching device 19. In this way, the robot 11 includes the operation-data display light 16*e* that performs the operation data clear indication act indicating the operation data. A second operation data clear indication act to a fifth operation data clear indication act respectively corresponding to the second operation data to the fifth operation data are set.

FIG. 5 is a schematic diagram for explaining the operation data. An example of the first operation data is shown. The second operation data to the fifth operation data are the same as the first operation data. Explanation of the second operation data to the fifth operation data is omitted. As shown in FIG. 5, the operation data 37 includes a flashing pattern, moving procedure data, and point data. Operation procedures for the arms 13 and the end effector 14 are shown in the moving procedure data. For example, in the operation of the first operation data, first, the robot 11 operates the arms 13 to move the end effector 14 to a point 1. Subsequently, the robot 11 stops for 0.5 second. The robot 11 operates the arms 13 to move the end effector 14 to a point 2. The robot 11 opens the finger sections of the end effector 14. Subsequently, the robot 11 stops for 2 seconds.

Subsequently, the robot 11 closes the finger sections of the end effect 15. The robot 11 operates the arms 13 to move the end effector 14 to a point 3. The robot 11 operates the arms 13 to move the end effector 14 to appoint 4. The robot 11 operates the arms 13 to move the end effector 14 to the point 1. The robot 11 stops and stays on standby until a moving instruction is given. Content indicating such operation procedures is included in moving procedure data. The moving procedure data is displayed on the display section 23 of the teaching device 19. The operator views the display section 23 and confirms the moving procedure data. The operator operates the input section 25 to change the moving procedure data.

In the point data, coordinate data of a point indicating a moving destination of the end effector 14 is shown in the point data. The coordinate data is data of a three-dimensional coordinate corresponding to the three axes of the X axis, the Y axis, and the Z axis. In FIG. 5, data of the point 1 to the point 4 are shown. The number of data of the point data is not particularly limited.

The operator can operate the teaching device 19 to operate the robot 11, acquire the position of the end effector 14 from the arm sensor 58 and the end effector sensor 62 and, set point data. Besides, the operator can operate the input section 25 to directly input the point data to the teaching device 19.

FIG. 6 is a schematic diagram for explaining robot and operation data correspondence data. The robot and operation data correspondence data indicates correspondence between the robots 11 and operation data. In other words, the robot and operation data correspondence data is data indicating correspondence between the robots 11 and operation data to be transmitted to the robots 11. In an example shown in FIG. 6, the operation data 37 is first operation data to ninth operation data. The first operation data is planned to be transmitted to the first robot 6. The second operation data is planed to be transmitted to the second robot 7. The third operation data is planned to be transmitted to the third robot 8. The robot and operation data correspondence data is displayed on the display section 23 of the teaching device 19. The operator views the display section 23 and confirms the robot and operation data correspondence data. The operator operates the input section 25 to change the robot and operation data correspondence data.

Figure 7:
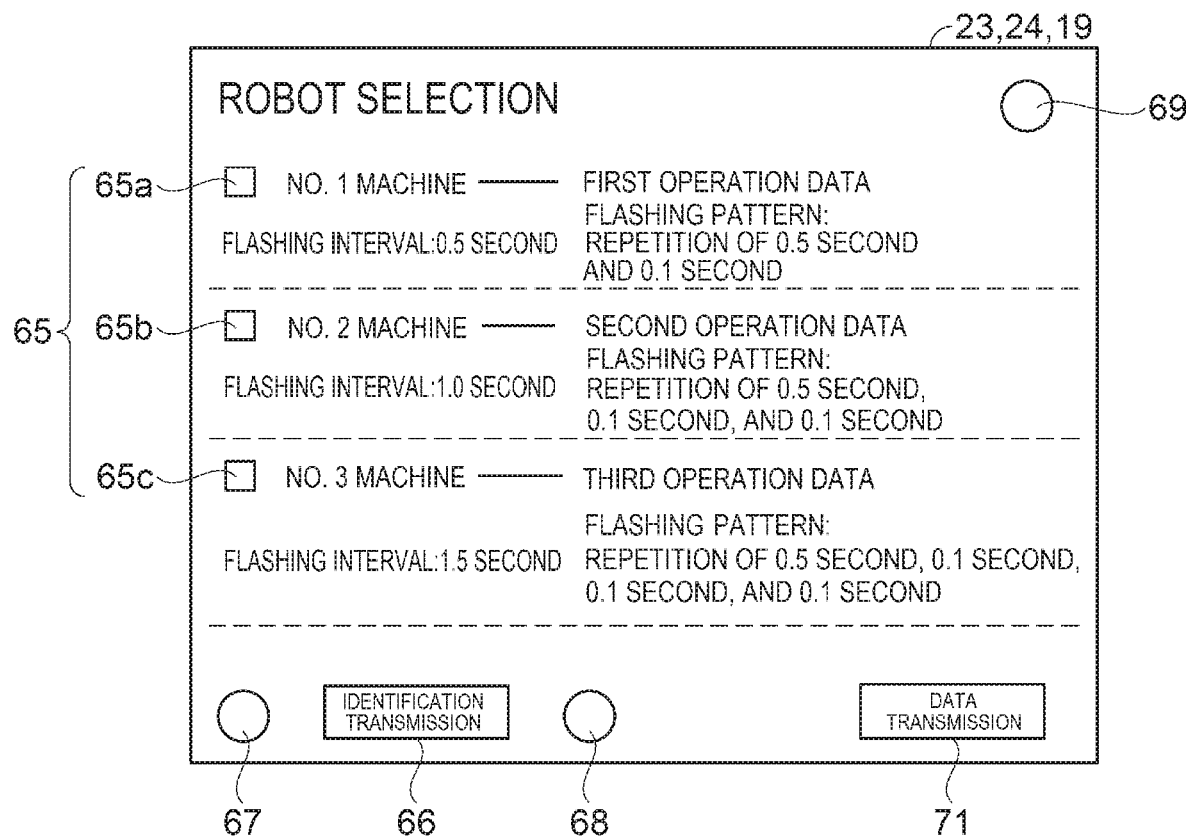
FIG. 7 is a schematic diagram for explaining a robot selection screen.

FIG. 7 is a schematic diagram for explaining a robot selection screen. The robot selection screen shown in FIG. 7 is displayed on the display section 23 of the teaching device 19. The robot and operation data correspondence data is displayed on the robot selection screen. A flashing interval for identifying the robot 11 and a flashing pattern indicating the operation data 37 are displayed on the robot selection screen. Besides, a selection field 65, an identification transmission button 66, a robot-identification display section 67, a data-identification display section 68, an abnormality display section 69 functioning as an abnormality notifying section, and a data transmission button 71 are displayed on the display section 23.

The selection field 65 includes a first selection field 65a, a second selection field 65b, and a third selection field 65c. The first selection field 65a corresponds to the first robot 6. The second selection field 65b corresponds to the second robot 7. The third selection field 65c corresponds to the third robot 8.

The operator selects a robot name and touches the selection field 65 corresponding to the selected robot name. The operator touches the identification transmission button 66. Then, the robot-identification display section 67 and the identification display light 16d flash at a flashing interval corresponding to the selected robot 11. Further, the data-identification display section 68 and the operation-data display light 16e flash at a flashing interval corresponding to the selected operation data 37. When the operator confirms that the flashing is as planned, the operator touches the data transmission button 71. Then, the operation data 37 is transmitted to the selected robot 11. The abnormality display section 69 flashes when an abnormality occurs in the operation of the robot system 1 and notifies that the robot system 1 is in an abnormal state.

Figure 8:
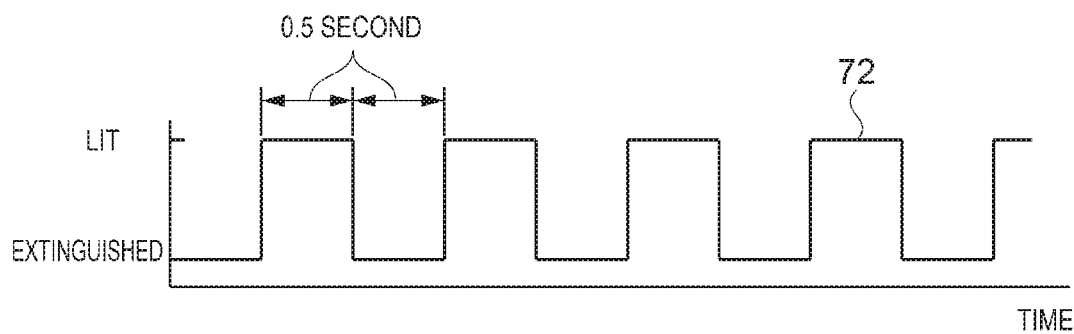
FIG. 8 is a diagram for explaining an identification operation for a first robot.

FIG. 8 is a diagram for explaining an identification operation for the first robot. The identification operation for the first robot 6 is operation for flashing the identification display light 16d of the first robot 6. In FIG. 8, the horizontal axis indicates transition of time. Time transitions from the left side to the right side. The vertical axis indicates lighting and extinction. A first transition lint 72 indicates a state in which the identification display light 16d of the first robot 6 flashes. As indicated by the first transition line 72, in the identification operation for the first robot 6, the identification display light 16d is lit for 0.5 second and extinguished for 0.5 second. The lighting and the extinction are repeated at the same interval.

Figure 9:
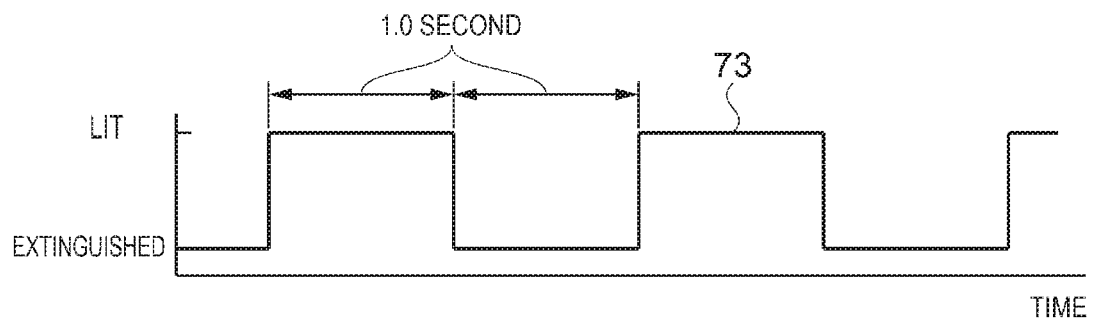
FIG. 9 is a diagram for explaining an identification operation for a second robot.

FIG. 9 is a diagram for explaining an identification operation for the second robot. The identification operation for the second robot 7 is operation for flashing the identification display light 16d of the second robot 7. In FIG. 9, the horizontal axis and the vertical axis are the same as those in FIG. 8. A second transition line 73 indicates a state in which the identification display light 16d of the second robot 7 flashes. As indicated by the second transition line 73, in the identification operation for the second robot 7, the identification display light 16d is lit for 1.0 second and extinguished for 1.0 second. The lighting and the extinction are repeated at the same interval.

Figure 10:
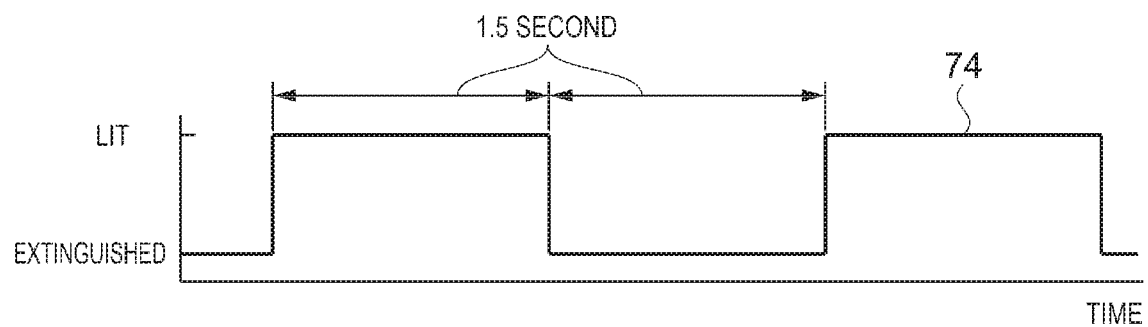
FIG. 10 is a diagram for explaining an identification operation for a third robot.

FIG. 10 is a diagram for explaining an identification operation for the third robot. The identification operation for the third robot 8 is operation for flashing the identification display light 16d of the third robot 8. In FIG. 10, the horizontal axis and the vertical axis are the same as those in FIG. 8. A third transition line 74 indicates a state in which the identification display light 16d of the third robot 8 flashes. As indicated by the third transition line 74, in the identification operation for the third robot 8, the identification display light 16d is lit for 1.5 seconds and extinguished for 1.5 seconds. The lighting and the extinction are repeated at the same interval.

The first transition line 72, the second transition line 73, and the third transition line 74 respectively have different flashing intervals. The operator can easily identify the robots 11 by viewing the identification display light 16d.

Figure 11:
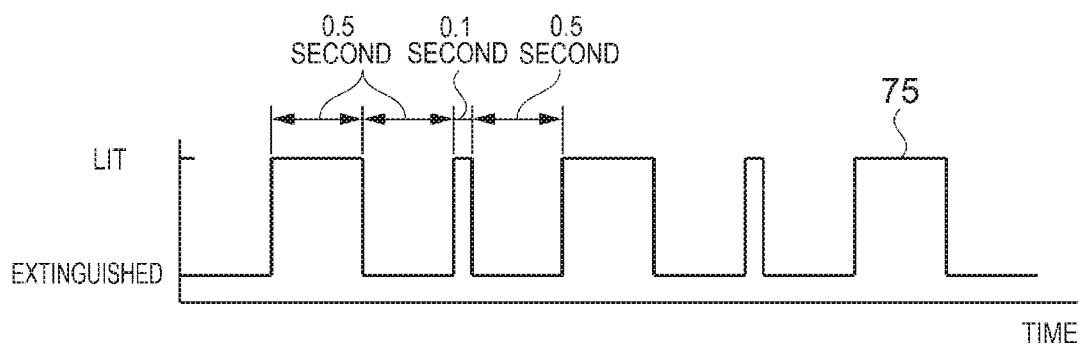
FIG. 11 is a diagram for explaining an operation data clear indication act for first operation data.

FIG. 11 is a diagram for explaining an operation data clear indication act for the first operation data. The operation data clear indication act for the first operation data is an act of flashing the operation-data display light 16e of the designated robot 11. In FIG. 11, the horizontal axis and the vertical axis are the same as those in FIG. 8. A fourth transition line 75 indicates a state in which the operation-data display light 16e, in which the operation data clear indication act for the first operation data is performed, flashes. As indicated by the fourth transition line 75, in the operation data clear indication act for the first operation data, the operation-data display light 16e is lit for 0.5 second, extinguished for 0.5 second, lit for 0.1 second, and extinguished for 0.5 second. The lighting and the extinction are repeated in this pattern in the operation data clear indication act for the first operation data.

Figure 12:
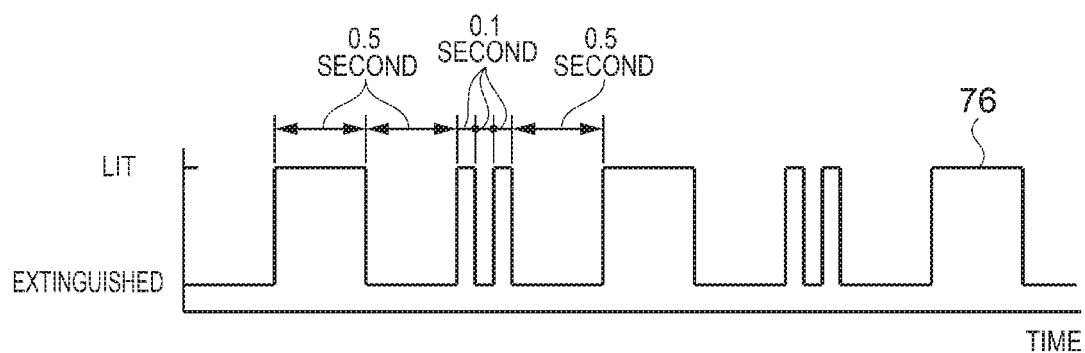
FIG. 12 is a diagram for explaining an operation data clear indication act for second operation data.

FIG. 12 is a diagram for explaining an operation data clear indication act for the second operation data. The operation data clear indication act for the second operation data is an act of flashing the operation-data display light 16e of the designated robot 11. In FIG. 12, the horizontal axis and the vertical axis are the same as those in FIG. 8. A fifth transition line 76 indicates a state in which the operation-data display light 16e, in which the operation data clear indication act for the second operation data is performed, flashes. As indicated by the firth transition line 76, in the operation data clear indication act for the second operation data, the operation-data display light 16e is lit for 0.5 second, extinguished for 0.5 second, lit for 0.1 second, extinguished for 0.1 second, lit for 0.1 second, and extinguished for 0.5 second. The lighting and the extinction are repeated in this pattern in the operation data clear indication act for the second operation data.

Figure 13:
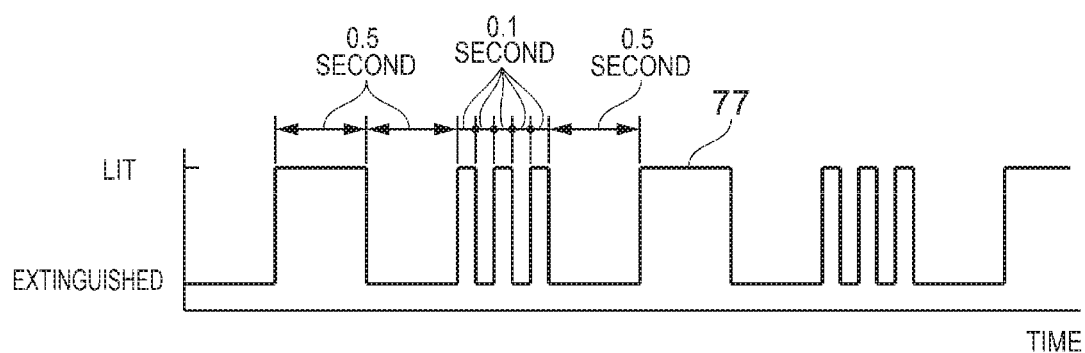
FIG. 13 is a diagram for explaining an operation data clear indication act for third operation data.

FIG. 13 is a diagram for explaining an operation data clear indication act for the third operation data. The operation data clear indication act for the third operation data is an act of flashing the operation-data display light 16e of the designated robot 11. In FIG. 13, the horizontal axis and the vertical axis are the same as those in FIG. 8. A sixth transition line 77 indicates a state in which the operation-data display light 16e, in which the operation data clear indication act for the third operation data is performed, flashes. As indicated by the sixth transition line 77, in the operation data clear indication act for the third operation data, the operation-data display light 16e is lit for 0.5 second, extinguished for 0.5 second, lit for 0.1 second, extinguished for 0.1 second, lit for 0.1 second, extinguished for 0.1 second, lit for 0.1 second, and extinguished for 0.5 second. The lighting and the extinction are repeated in this pattern in the operation data clear indication act for the third operation data.

Figure 14:
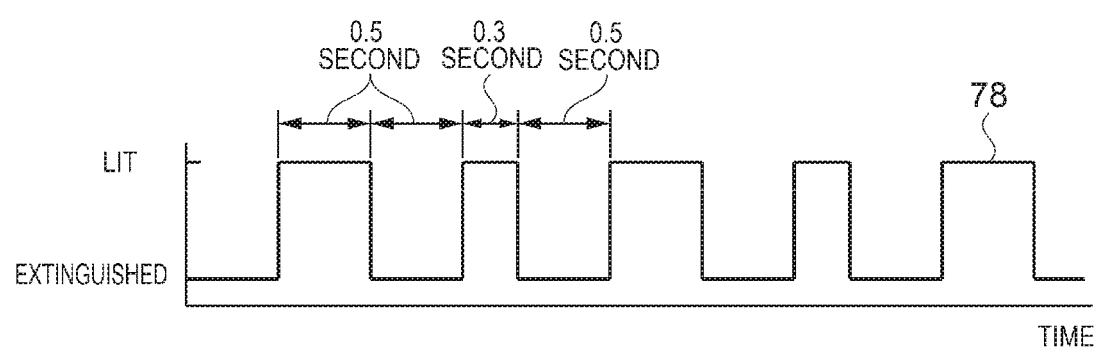
FIG. 14 is a diagram for explaining an operation data clear indication act for fourth operation data.

FIG. 14 is a diagram for explaining an operation data clear indication act for the fourth operation data. The operation data clear indication act for the fourth operation data is an act of flashing the operation-data display light 16e of the designated robot 11. In FIG. 14, the horizontal axis and the vertical axis are the same as those in FIG. 8. A seventh transition line 78 indicates a state in which the operation-data display light 16e, in which the operation data clear indication act for the fourth operation data is performed, flashes. As indicated by the seventh transition line 78, in the operation data clear indication act for the fourth operation data, the operation-data display light 16e is lit for 0.5 second, extinguished for 0.5 second, lit for 0.3 second, and extinguished for 0.5 second. The lighting and the extinction are repeated in this pattern in the operation data clear indication act for the fourth operation data. In this way, the operation data clear indication act is the act of flashing the pattern corresponding to the operation data 37. In the robot 11, the operation-data display light 16e performs the operation data clear indication act for indicating the operation data 37.

The fourth transition line 75, the fifth transition line 76, the sixth transition line 77, and the seventh transition line 78 respectively have different flashing patterns. The operator can easily identify the operation data 37 by viewing the operation-data display light 16e.

Figure 15:
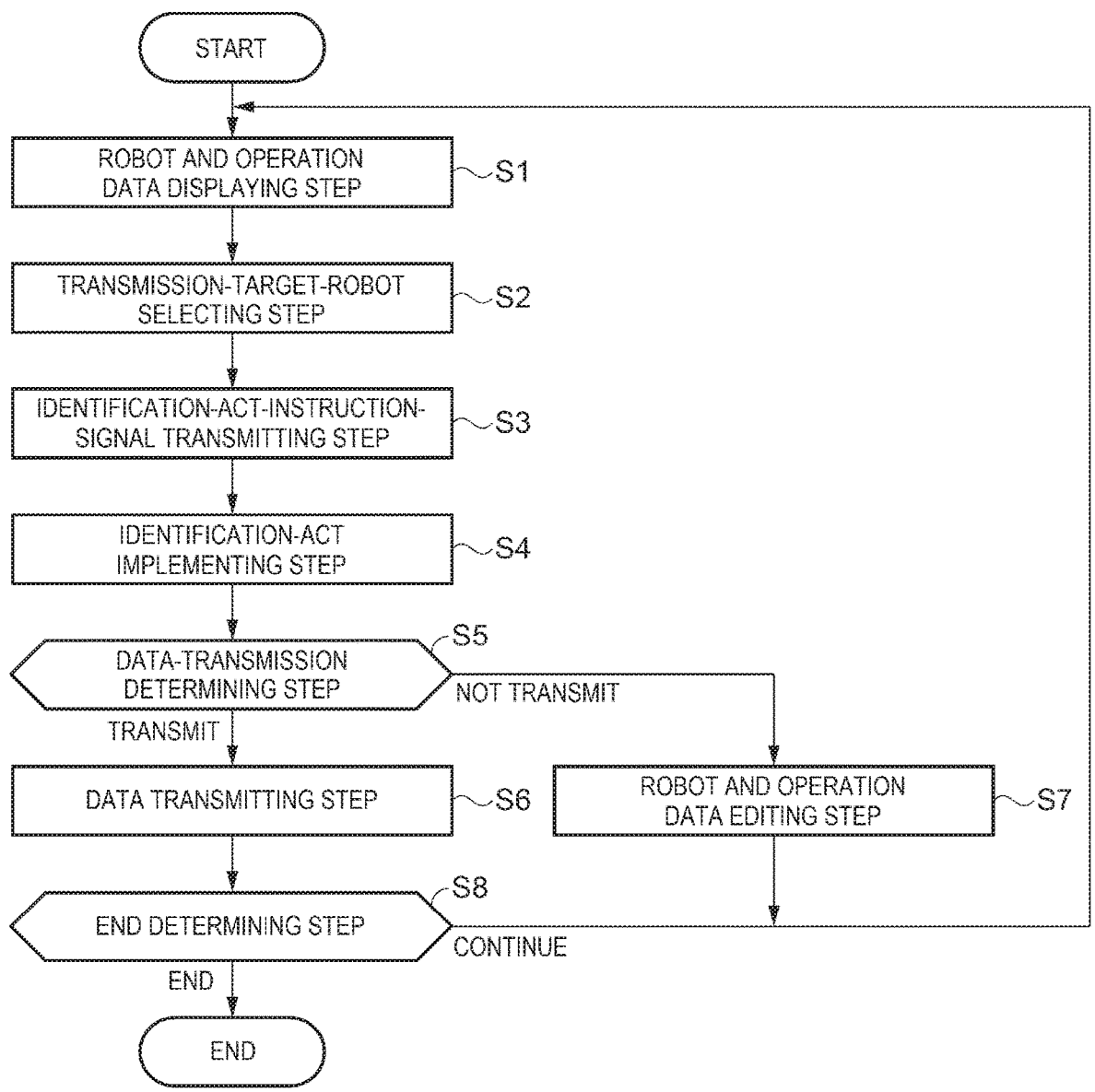
FIG. 15 is a flowchart of a control method.

Control for transmitting operation data from the teaching device 19 to the robots 11 in the control method performed by the robot system 1 explained above is explained with reference to FIGS. 15 to 17. FIG. 15 is a flowchart of the control method. In the flowchart of FIG. 15, step S1 is a robot and operation data displaying step. In this step, the display section 23 of the teaching device 19 displays correspondence between the identification act data indicating the identification act for identifying the robots 11 and the operation data 37 indicating the operation contents of the robots 11. Subsequently, the robot system 1 shifts to step S2. Step S2 is a transmission-target-robot selecting step. In this step, the operator inputs information indicating a transmission target robot 11, which is a transmission destination of the operation data 37, and the input section 25 of the teaching device 19 receives the input of the information. Subsequently, the robot system 1 shifts to step S3.

Step S3 is an identification-act-instruction-signal transmitting step. In this step, the wireless LAN slave machine 31 of the teaching device 19 transmits an identification act instruction signal for causing the robot 11 to perform an identification act to the robot 11, which executes the identification act, among the plurality of robots 11. Further, the wireless LAN slave machine 31 of the teaching device 19 transmits an operation data clear indication instruction signal indicating the operation data 37 to the transmission target robot 11 in addition to the identification act instruction signal. In the robot 11, which executes the identification act, the slave-set LAN communication section 54 receives the identification act instruction signal and the operation data clear indication instruction signal. Subsequently, the robot system 1 shifts to step S4.

Step S4 is an identification-act implementing step. In this step, when the slave-set LAN communication section 54 receives the identification act instruction signal, the robot, which executes an identification act for which the identification act instruction signal is received, performs the identification act. Specifically, the identification display light 16d performs the identification act. Further, in the robot 11, which executes an identification act for which the slave-set LAN communication section 54 receives the operation data clear indication instruction signal, the operation-data display light 16e performs an operation data clear indication act based on the operation data clear indication instruction signal in addition to the identification act. Subsequently, the robot system 1 shifts to step S5.

Step S5 is a data-transmission determining step. In this step, after the transmission target robot 11 starts the identification act, the operator inputs a result of selection about whether to transmit the operation data 37 to the transmission target robot 11, which executes the identification act. The input section 25 of the teaching device 19 receives the input. When the operator performs an input indicating that the operation data 37 is transmitted and the teaching device 19 receives the input, the robot system 1 shifts to step S6. When the operator performs an input for not transmitting the operation data 37 and the teaching device 19 receives the input, the robot system 1 shifts to step S7.

In step S5, it is not essential for the operator to input the selection result. In other words, at a stage of step S4 or preceding steps, the operator sets, in advance, in the teaching device 19, the robot 11 to which the operation data 37 is planned to be transmitted. When the robot 11, which performs the identification act, is the robot 11 to which the operation data is planned to be transmitted, the teaching device 19 performs the selection in step S5. The robot system 1 shifts to step S6 or step S7.

Step S6 is a data transmitting step. In this step, the transmission and reception control section for teaching 43 of the teaching device 19 causes the wireless LAN slave machine 31 to transmit the operation data 37 to the transmission target robot 11. In other words, after the robot 11, which executes the identification act, performs the identification act, when the robot 11, which executes the identification act, and the robot 11, to which the operation data 37 is planned to be transmitted, are the same, the teaching device 19 transmits the operation data 37 to the transmission target robot 11. In the robot 11, the slave-set LAN communication section 54 receives the operation data 37. The robot system 1 shifts to step S8.

Step S7 is a robot 11 and operation data editing step. In this step, the operator operates the teaching device 19 and edits the identification act data 36, the operation data 37, and the robot and operation data correspondence data 38. Subsequently, the robot system 1 shifts to step S1.

Step S8 is an end determining step. When the robot 11 that has not transmitted the operation data 37 is present, the robot system 1 determines to continue the control method and shifts to step S1. When that robot 11 that has not transmitted the operation data 37 is absent, the robot system 1 determines to end the control method. The robot system 1 ends the control for transmitting the operation data from the teaching device 19 to the robot 11. According to the steps explained above, the control method performed by the robot system 1 ends.

Figure 16:
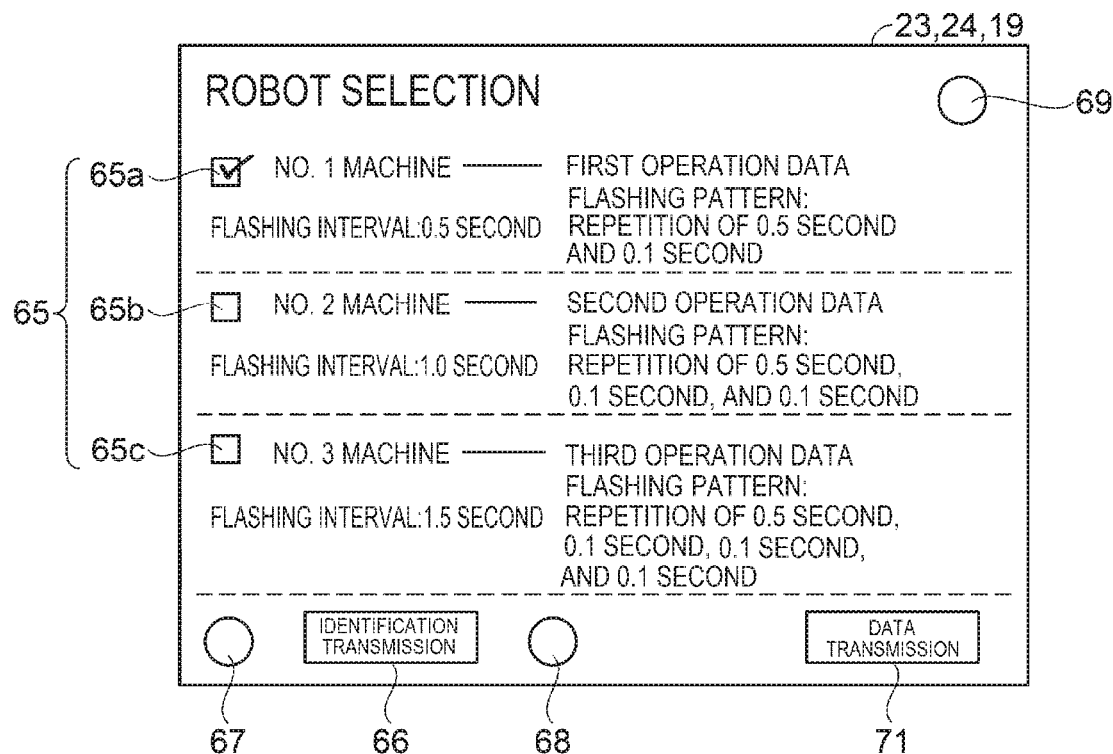
FIG. 16 is a schematic diagram for explaining a control method by the robot system.
Figure 17:
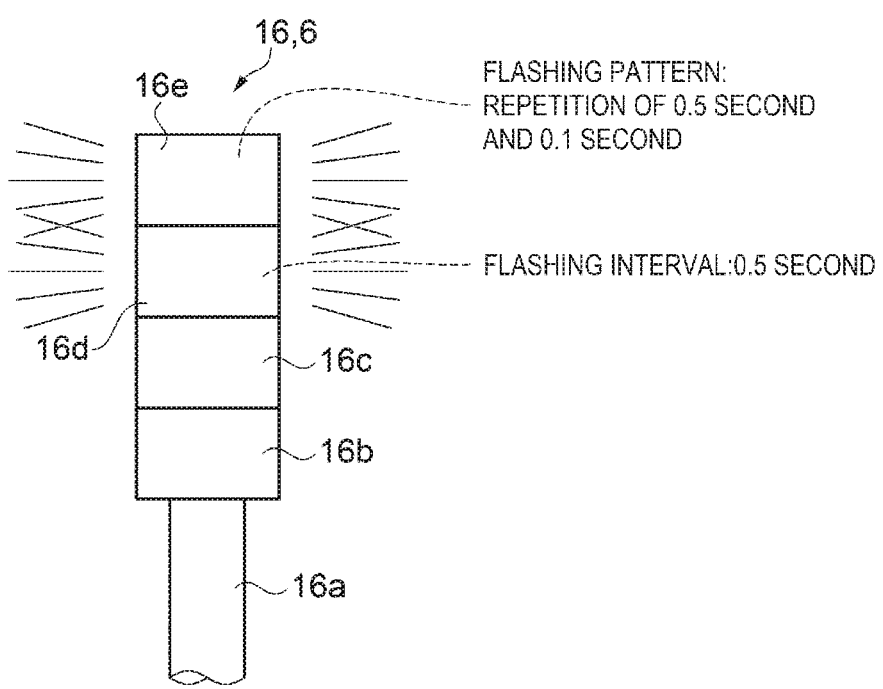
FIG. 17 is a schematic diagram for explaining the control method by the robot system.

The control method performed by the robot system 1 is explained in detail with reference to FIGS. 16 and 17 in association with the steps shown in FIG. 15. FIGS. 16 and 17 are schematic diagrams for explaining the control method by the robot system. FIG. 16 is a diagram corresponding to the robot and operation data displaying step in step S1, the transmission-target-robot selecting step in step S2, and the data-transmission determining step in step S5.

As shown in FIG. 16, in the robot and operation data displaying step of step S1, the identification act data 36 is displayed on the display section 23 of the teaching device 19. The flashing interval is 0.5 second in the identification act data 36 of the first robot 6. The flashing interval is 1.0 second in the identification act data 36 of the second robot 7. The flashing interval is 1.5 seconds in the identification act data 36 of the third robot 8.

Further, data of the operation data clear indication act is displayed on the display section 23 of the teaching device 19. The operation data corresponding to the first robot 6 is the first operation data. In the data of the operation data clear identification act in the first operation data, the flashing pattern is a pattern of repetition of 0.5 second and 0.1 second. The operation data corresponding to the second robot 7 is the second operation data. In the data of the operation data clear indication act in the second operation data, the flashing pattern is a pattern of repetition of 0.5 second, 0.1 second, and 0.1 second. The operation data corresponding to the third robot 8 is the third operation data. In the data of the operation data clear indication act in the third operation data, the flashing pattern is a pattern of repetition of 0.5 second, 0.1 second, 0.1 second, and 0.1 second.

The operation data 37 transmitted to the robots 11 is displayed on the display section 23. Data transmitted to the first robot 6 is the first operation data. Data transmitted to the second robot 7 is the second operation data. Data transmitted to the third robot 8 is the third operation data. The operator views the display section 23 and confirms the operation data 37 transmitted to the robots 11 by the teaching device 19.

In the transmission-target-robot selecting step of step S2, the operator selects the robot 11 at a transmission destination to which the operation data 37 is transmitted. The operator touches the selection field 65 corresponding to a name of the selected robot 11. As shown in FIG. 16, when the operator touches the first selection field 65*a*, in the teaching device 19, the touch pad 24 receives selection of the first robot 6. A mark is displayed in the first selection field 65*a*. Further, the operator touches the identification transmission button 66. In the teaching device 19, the touch pad 24 receives selection of the identification transmission button 66.

In the identification-act-instruction-signal transmitting step of step S3, the transmission and reception control section for teaching 43 forms a first identification act instruction signal from the first identification act data. The first identification act instruction signal is a signal for instructing to perform the first identification act. The first identification act instruction signal is included in the identification act instruction signal. Further, the transmission and reception control section for teaching 43 generates a first operation data clear indication instruction signal from the first operation data. The first operation data clear indication instruction signal is a signal for instructing to perform a first operation data clear indication act indicating the first operation data. The first operation data clear indication instruction signal is included in the operation data clear indication instruction signal.

In the teaching device 19, the transmission and reception control section for teaching 43 causes the wireless LAN slave set 31 to transmit the first identification act instruction signal and the first operation data clear indication instruction signal to the first robot 6 via the wireless LAN master set 17. The first robot 6 receives the first identification act instruction signal and the first operation data clear indication instruction signal.

FIG. 17 is a diagram corresponding to the identification-act implementing step of step S4. As shown in FIG. 17, in the display lamp unit 16 of the first robot 6, the identification display light 16*d* performs the first identification act. In other words, the identification display light 16*d* flashes at a 0.5-second interval. In the display lamp unit 16 of the first robot 6, the operation-data display light 16*e* performs the first operation data clear indication act. In other words, the operation-data display light 16*e* flashes in a pattern of repetition of 0.5 second and 0.1 second. In this way, light is emitted from the transmission target robot 11 in the identification act.

For example, when the first robot 6 receives the first identification act instruction signal and the second operation data, in the display lamp unit 16 of the first robot 6, the identification display light 16*d* performs the first identification act. In other words, the identification display light 16*d* flashes at a 0.5-second interval. In the display lamp unit 16 of the first robot 6, the operation-data display light 16*e* performs the second operation data clear indication act. In other words, the operation-data display light 16*e* flashes in a pattern of repetition of 0.5 second, 0.1 second, and 0.1 second.

Besides, for example, when the second robot 7 receives the second identification act instruction signal and the second operation data, in the display lamp unit 16 of the second robot 7, the identification display light 16*d* performs the second identification act. In other words, the identification display light 16*d* flashes at a 1.0 second interval. In the display lamp unit 16 of the second robot 7, the operation-data display light 16*e* performs the second operation data clear indication act. In other words, the operation-data display light 16*e* flashes in a pattern of repetition of 0.5 second, 0.1 second, and 0.1 second.

The robot-identification display section 67 of the teaching device 19 flashes at the same flashing interval as the flashing interval of the identification display light 16*d*. The operator can compare the identification display light 16*d* and the robot-identification display section 67 and confirm the transmission target robot 11. The data-identification display section 68 of the teaching device 19 flashes in the same flashing pattern as the flashing pattern of the operation-data display light 16*e*. The operator can compare the operation-data display light 16*e* and the data-identification display section 68 and confirm the operation data 37 to be transmitted.

In the data-transmission determining step of step S5, the operator confirms whether the first robot 6 is performing the first identification act. The operator confirms whether the operation data 37 being about to be transmitted to the first robot 6 is the first operation data. The operator inputs a result of selection about whether to transmit operation data to the robot 11 to which the teaching device 19 is about to transmit the operation data 37. When the operator selects to transmit the operation data 37, the operator touches the data transmission button 71 of the teaching device 19. The input section 25 receives the selection of the data transmission button 71.

One of the operation buttons 22 is an editing button, which is a button for switching to a mode for editing data. When the operator selects not to transmit the operation data 37, the operator presses the editing button. The input section 25 receives the selection of the editing button.

When the input section 25 receives the selection of the data transmission button 71, in the data transmitting step of step S6, the transmission and reception control section for teaching 43 causes the wireless LAN slave set 31 to transmit the first operation data to the first robot 6. The first robot 6 receives the first operation data. The first robot 6 causes the storing section 47 to store the first operation data.

When the input section 25 receives the selection of the editing button, the operator edits data in the robot and operation data editing step in step S7. The operator operates the teaching device 19 to edit the identification act data 36, the operation data 37, and the robot and operation data correspondence data 38. The robot system 1 shifts to step S1.

In step S8, when the robot system 1 determines to continuously transmit the operation data 37 to the second robot 7 and the third robot 8, the robot system 1 shifts to step S1. When the operation data 37 is transmitted to the first robot 6 to the third robot 8, in step S8, the robot system 1 determines to end the control method. The robot system 1 ends the control for transmitting the operation data from the teaching device 19 to the robots 11. According to the steps explained above, the control performed by the robot system 1 ends.

As explained above, according to this embodiment, the following effects are obtained.

(1) According to the control method in this embodiment, the teaching device 19 displays the correspondence between the identification act data 36 and the operation data 37. The operator views displayed content and confirms the correspondence between the identification act data 36 and the operation data 37. In other words, the operator confirms content of the identification act performed by the robot 11 planned to receive the predetermined operation data 37. The operator inputs, to the teaching device 19, information indicating the transmission target robot 11 to which the operation data 37 is transmitted. The teaching device 19 transmits, according to the input information, an identification act instruction signal to the robot 11 that the teaching device 19 causes to perform the identification act. The transmission target robot 11, which receives the identification act instruction signal, performs the identification act.

The operator memorizes content of operation planned to be performed by the robots 11. Further, the operator memorizes correspondence between the identification act data 36 and the operation data 37. The operator confirms, viewing the identification display light 16d, which transmission target robot 11 among the plurality of robots 11 is performing the identification act. The operator confirms whether the transmission target robot 11, which is performing the identification act, is a target to which the operation data 37 is transmitted.

Subsequently, the operator inputs, to the teaching device 19, a result of selection about whether to transmit the operation data 37 to the robot 11, which is performing the identification act. When the input section 25 receives an input indicating that the teaching device 19 transmits the operation data 37, the teaching device 19 transmits the operation data 37 to the robot 11, which is performing the identification act. In this way, the operator confirms, using the identification act and the content displayed on the teaching device 19, the robot 11 to which the operation data 37 is transmitted. As a result, it is possible to reduce wrong transmission of the operation data 37 to the robot 11 to which the operation data 37 is not planned to be transmitted.

(2) With the control method in this embodiment, the teaching device 19 transmits the identification act instruction signal and the operation data clear indication instruction signal to the transmission target robot 11. The robot 11, which executes the identification act, receives the operation data clear indication instruction signal. The robot 11, which executes the identification act, performs the identification act and the operation data clear indication act. The operator confirms the operation data 37 planned to be transmitted to the robot 11, which executes the identification act. Therefore, the operator can confirm the transmission target robot 11 to which the operation data 37 is transmitted among the plurality of robots 11 and confirm the operation data 37 to be transmitted.

(3) With the robot system 1 and the control method in this embodiment, light is emitted from the identification display light 16d in the identification act. At this time, if light flashing at a plurality of kinds of intervals is emitted, the transmission target robot 11 can perform a plurality of kinds of identification acts. Even when noise in an environment in which the robot system 1 is set is large, the operator can confirm the light emitted by the identification display light 16d.

(4) With the robot system 1 in this embodiment, the robot system 1 includes the teaching device 19 and the plurality of robots 11. The plurality of robots 11 are connected to the teaching device 19 via the network 63. The display section 23 displays the identification act data 36 and the operation data 37 in the robots 11. The operator views the flashing of the identification display light 16d and identifies the robot 11.

The operator selects the transmission target robot 11 and inputs the information indicating the selected transmission target robot 11 to the input section 25 of the teaching device 19. The transmission target robot 11 is the robot 11 at the transmission destination of the operation data 37. When the information indicating the transmission target robot 11 is input to the input section 25, the wireless LAN slave set 31 transmits the identification act instruction signal to the transmission target robot 11.

The robot 11 includes the slave-set LAN communication section 54 and the identification display light 16d. The slave-set LAN communication section 54 receives the identification act instruction signal. In the robot 11, which receives the identification act instruction signal, the identification display light 16d preforms the identification act. The identification act indicates flashing of light.

In the teaching device 19, the display section 23 displays an identification name of the operation data 37 planned to be transmitted to the transmission target robot 11. The operator confirms the displayed identification name of the operation data 37 to thereby confirm the operation data planned to be transmitted to the transmission target robot 11. The operator confirms the identification act and confirms the entity of the transmission target robot 11 and the operation data 37 planned to be transmitted to the transmission target robot 11. The operator selects whether to transmit, to the robot 11, which performs the identification act, the operation data 37 planned to be transmitted to the transmission target robot 11.

The operator inputs, to the input section 25 of the teaching device 19, a result of the selection about whether to transmit the operation data 37 to the robot 11, which performs the identification act. When the selection to transmit the operation data 37 is input to the input section 25, the transmission and reception control section for teaching 43 causes the wireless LAN slave set 31 of the teaching device 19 to transmit the operation data 37 to the robot 11, which performs the identification act. The transmission target robot 11 receives the operation data 37. Since the robot 11, to which the operation data 37 is transmitted, is confirmed by the identification act in this way, it is possible to reduce wrong transmission of the operation data 37 by the teaching device 19 to the robot 11 to which the operation data 37 is not planned to be transmitted.

(5) With the robot system 1 in this embodiment, the wireless LAN slave set 31 transmits the identification act instruction signal and the operation data clear indication instruction signal to the transmission target robot 11. In the transmission target robot 11, the slave-set LAN communication section 54 receives the operation data clear indication instruction signal. The transmission target robot 11 performs the identification act and the operation data clear indication act. The operation data clear indication act indicates flashing of light. The operator confirms the operation data 37 planned to be transmitted to the transmission target robot 11. Therefore, the operator can confirm the transmission target robot 11 to which the operation data 37 is transmitted among the plurality of robots 11 and confirm the operation data 37 to be transmitted.

Second Embodiment

Figure 18:
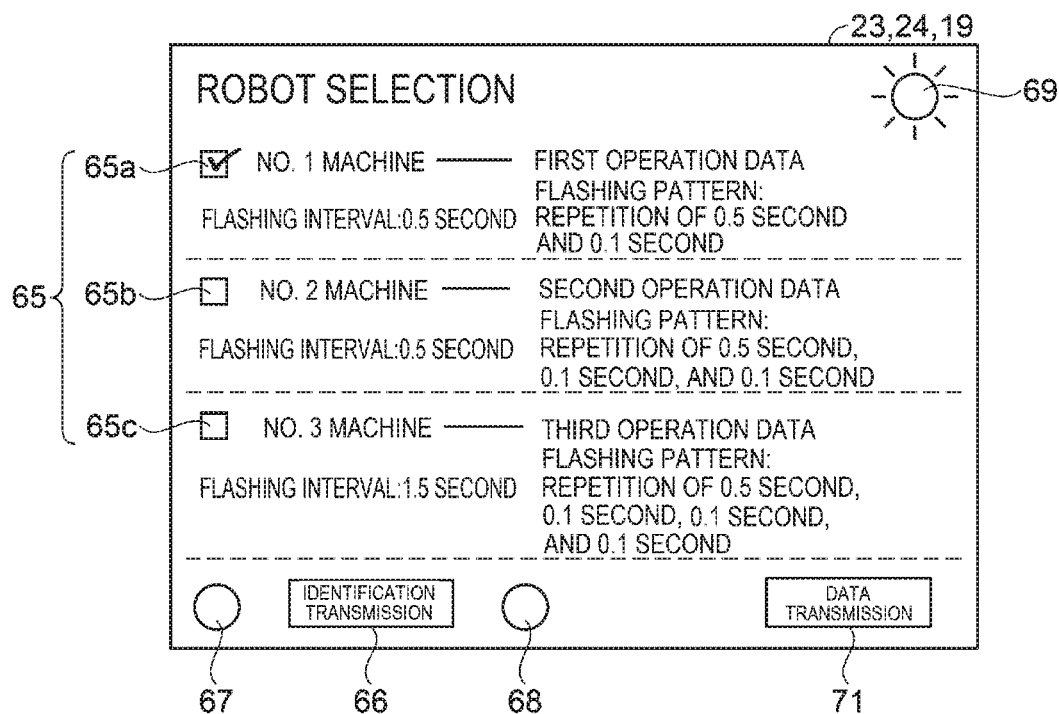
FIG. 18 is a schematic diagram for explaining a control method by a robot system according to a second embodiment.
Figure 19:
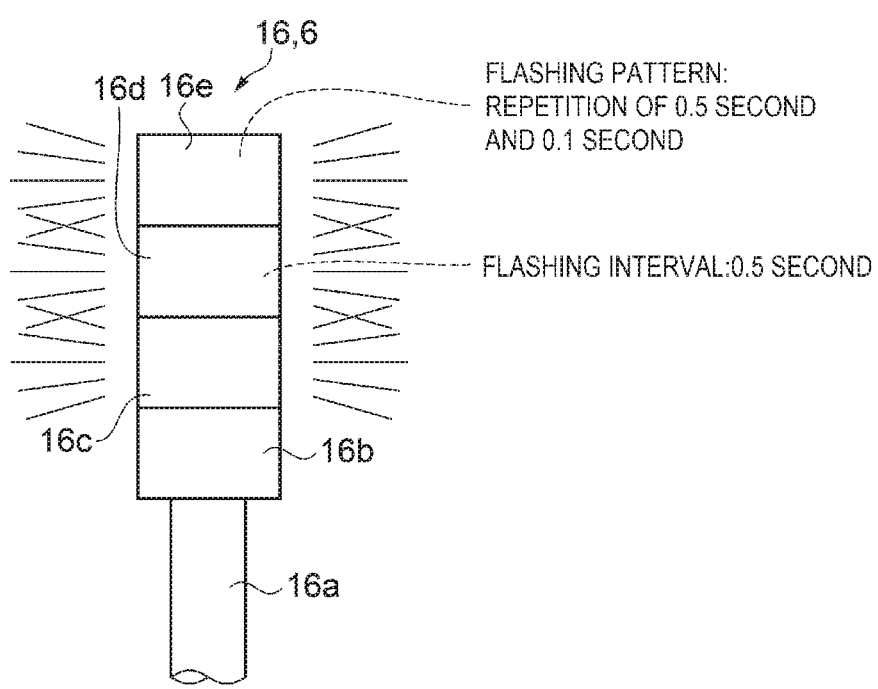
FIG. 19 is a schematic diagram for explaining the control method by the robot system.

A second embodiment of the robot system is explained with reference to FIGS. 18 and 19. FIGS. 18 and 19 are schematic diagrams for explaining a control method by the robot system. This embodiment is different from the first embodiment in that, when performing the same identification act, the first robot 6 and the second robot 7 notify that the same identification act is performed. Explanation is omitted about similarities to the first embodiment.

FIG. 18 is a diagram for explaining a robot selection screen. As shown in FIG. 18, identification act data and operation data are displayed on the display section 23 in the robot and operation data displaying step of step S1 and the transmission-target-robot selecting step of step S2.

The operation data 37 of first robot 6, the second robot 7, and the third robot 8 are respectively first operation data, second operation data, and third operation data. The operation data 37 transmitted to the robots 11 are different data. The first identification act data and the second identification act data are the same data. In other words, both of flashing intervals of the identification display light 16d in the first identification act data and the second identification act data are 0.5 second. At this time, since the operator cannot distinguish the first robot 6 and the second robot 7 even if the operator views the identification display light 16d, the operator is likely to mistake a transmission destination of the operation data 37.

In step S2, the operator touches the selection field 65a. Subsequently, the operator touches the identification transmission button 66. In the teaching device 19, the touch pad 24 receives selection of the identification transmission button 66.

In step S3, the transmission and reception control section for teaching 43 confirms that the operation data 37 of the first robot 6 and the operation data 37 of the second robot 7 are different. Further, the transmission and reception control section for teaching 43 confirms that the first identification act data and the second identification act identification act data are the same. Since the first identification act data and the second identification act data are the same, the first identification act instruction signal and the second identification act instruction signal are the same signal. The transmission and reception control section for teaching 43 flashes the abnormality display section 69 to notify the operator that the first identification act instruction signal and the second identification act instruction signal are the same signals.

In other words, as correct instruction signals, the first identification act instruction signal transmitted to the first robot 6 and the second identification act instruction signal transmitted to the second robot 7 are different identification act instruction signals. When the first identification act instruction signal and the second identification act instruction signal are the same identification act instruction signals, the first identification act instruction signal and the second identification act instruction signal are wrong instruction signals. Therefore, when the first identification act instruction signal and the second identification act instruction signal should be different but are the same, the teaching device 19 flashes the abnormality display section 69 and notifies the operator that the first identification act instruction signal and the second identification act instruction signal are the same.

FIG. 19 is a diagram corresponding to the identification-act implementing step of step S4. As shown in FIG. 19, in the display lamp unit 16 of the first robot 6, the identification display light 16d performs the first identification act. In the display lamp unit 16 of the first robot 6, the operation-data display light 16e performs the first operation data clear indication act. Further, the abnormality display light 16c flashes to notify the operator that the first identification act instruction signal and the second identification act instruction signal are the same.

When the first identification act instruction signal and the third identification act instruction signal are the same, the abnormality display section 69 and the abnormality display light 16c also flash. When the second identification act instruction signal and the third identification act instruction signal are the same, the abnormality display section 69 and the abnormality display light 16c also flash.

In the robot system 1 and the control method by the robot system 1, when the teaching device 19 is about to transmit, to the plurality of robots 11, identification act instruction signals for causing the plurality of robots 11 to perform the same identification act, the teaching device 19 notifies that the identification act instruction signals transmitted to the plurality of robots 11 are the same. The abnormality display light 16c flashes to notify that the plurality of robots 11 perform the same identification act. When the plurality of robots 11 perform the same identification act, it is difficult for the operator to identify the robots 11. At this time, the operator confirms content notified by the abnormality display light 16c and performs setting for causing each of the robots 11 to perform a different identification act. As a result, since the plurality of robots 11 respectively perform identification acts different from one another, the operator can identify a transmission target robot 11.

Third Embodiment

A third embodiment of the robot system is explained with reference to FIGS. 20 to 24. This embodiment is different from the first embodiment in that the same operation data 37 is transmitted to the first robot 6 and the second robot 7. Explanation is omitted concerning similarities to the first embodiment.

Figure 20:
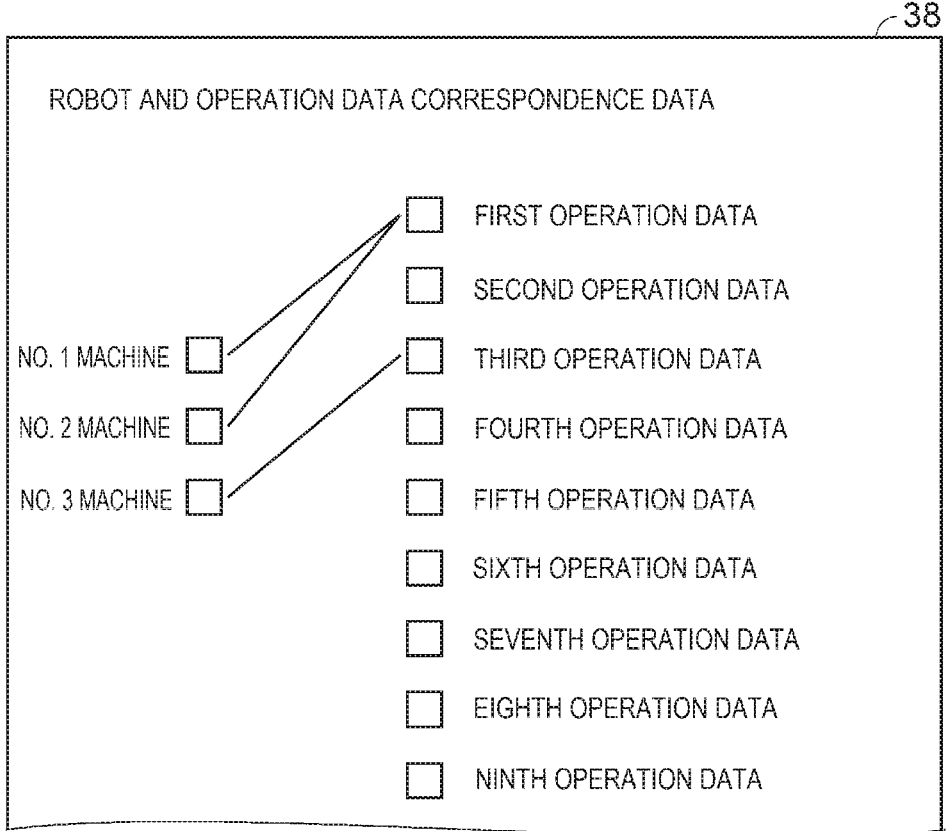
FIG. 20 is a schematic diagram for explaining robot and operation data correspondence data according to a third embodiment.

FIG. 20 is a schematic diagram for explaining operation data correspondence data. In this embodiment, as shown in FIG. 20, the first operation data is planned to be transmitted to the first robot 6 and the second robot 7.

Figure 21:
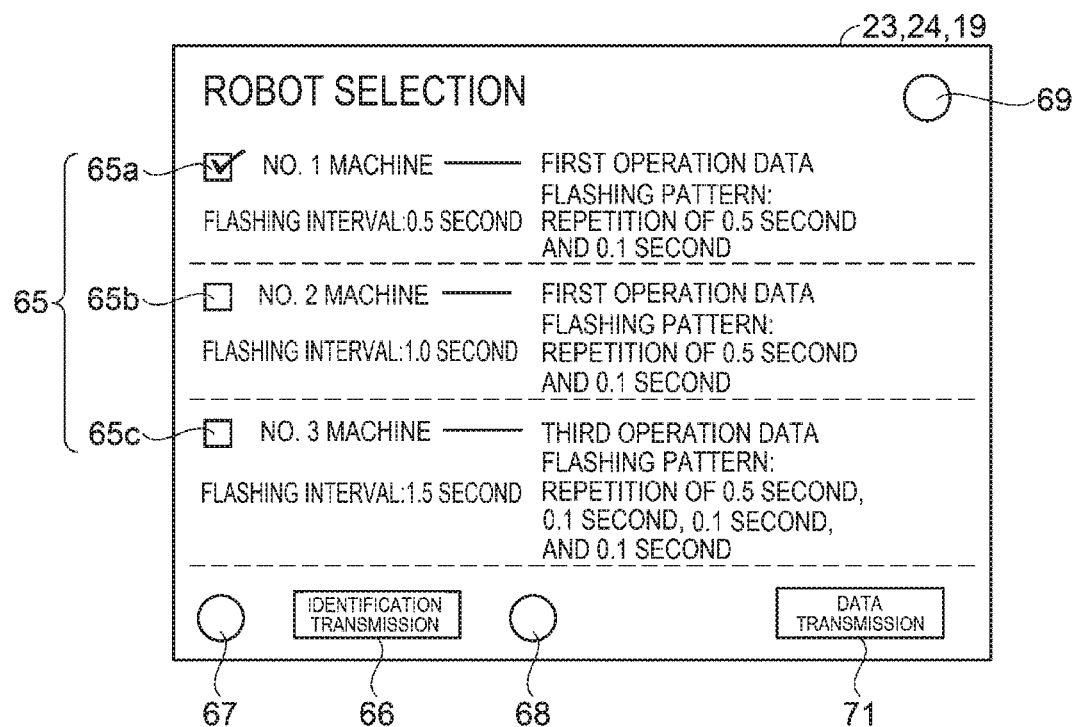
FIG. 21 is a schematic diagram for explaining a control method by a robot system.

FIGS. 21 to 24 are schematic diagrams for explaining a control method by the robot system. FIG. 21 is a diagram corresponding to the robot and operation data displaying step of step S1 and the transmission-target-robot selecting step of step S2. As shown in FIG. 21, in step S2, the operator touches the first selection field 65a. Subsequently, the operator touches the identification transmission button 66. In the teaching device 19, the touch pad 24 receives selection of the identification transmission button 66. Subsequently, the robot system shifts to step S3.

In the identification-act-instruction-signal transmitting step of step S3, the teaching device 19 transmits the first identification act instruction signal and the first operation data to the first robot 6. Subsequently, the robot system shifts to step S4.

Figure 22:
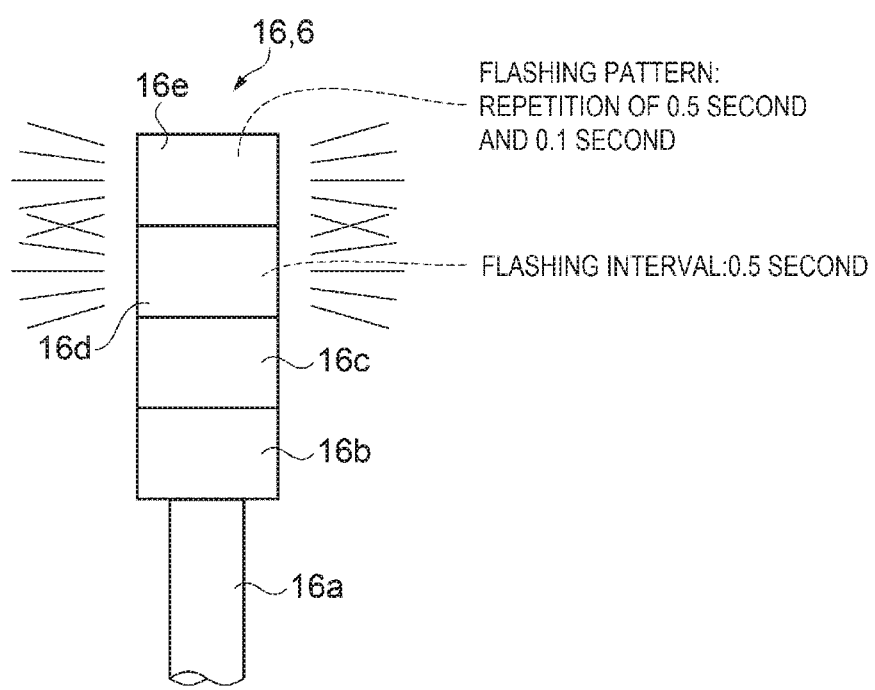
FIG. 22 is a schematic diagram for explaining the control method by the robot system.

FIG. 22 is a diagram corresponding to the identification-act implementing step of step S4. As shown in FIG. 22, in the display lamp unit 16 of the first robot 6, the identification display light 16d performs the first identification act. In the display lamp unit 16 of the first robot 6, the operation-data display light 16e performs the first operation data clear indication act. Subsequently, the robot system shifts to step S2 through step S5, step S6, step S8, and step S1.

Figure 23:
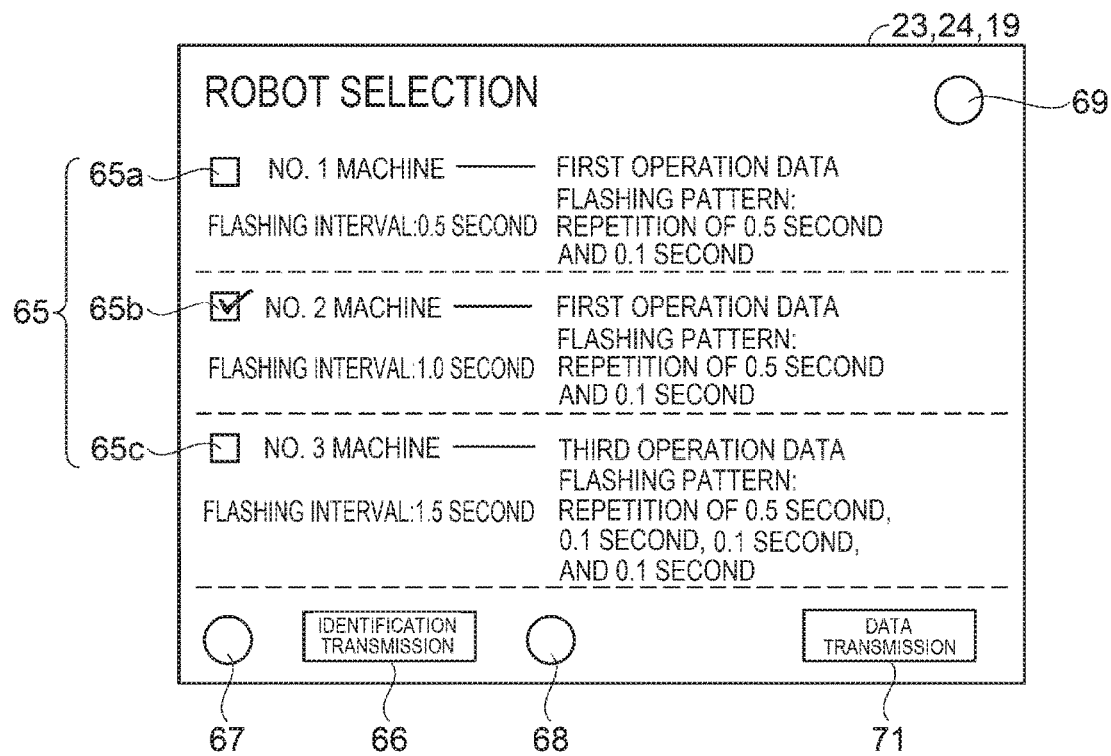
FIG. 23 is a schematic diagram for explaining the control method by the robot system.

FIG. 23 is a diagram corresponding to the transmission-target-robot selecting step of step S2. As shown in FIG. 23, in step S2, the operator touches the second selection field 65b. Subsequently, the operator touches the identification transmission button 66. In the teaching device 19, the touch pad 24 receives selection of the identification transmission button 66. Subsequently, the robot system shifts to step S3.

In the identification-act-instruction-signal transmitting step of step S3, the teaching device 19 transmits the second identification act instruction signal and the first operation data to the second robot 7. Subsequently, the robot system shifts to step S4.

Figure 24:
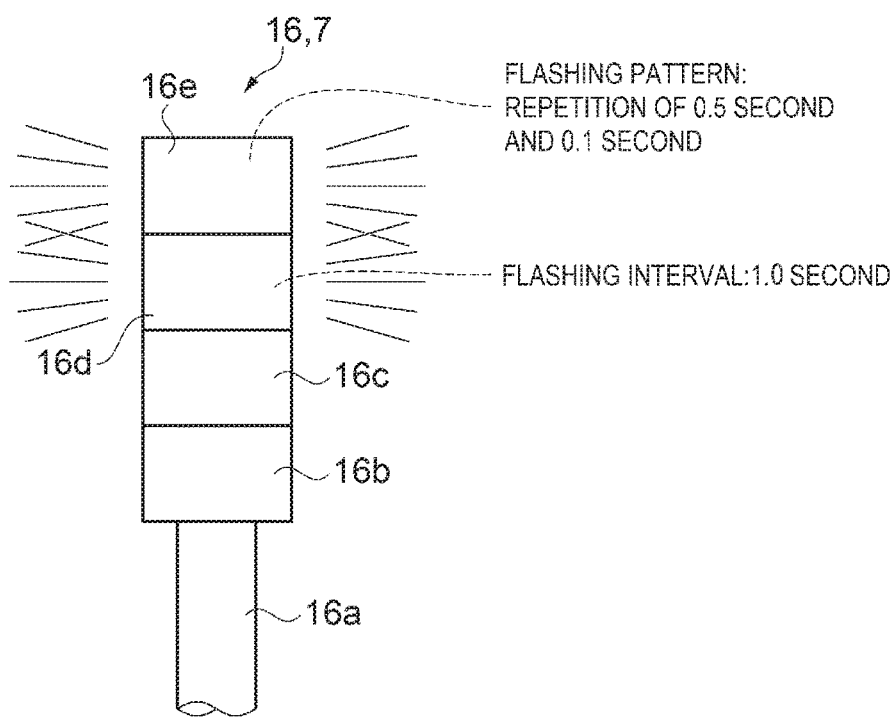
FIG. 24 is a schematic diagram for explaining the control method by the robot system.

FIG. 24 is a diagram corresponding to the identification-act implementing step of step S4. As shown in FIG. 24, in the display lamp unit 16 of the second robot 7, the identification display light 16d performs the second identification act. In the display lamp unit 16 of the second robot 7, the operation-data display light 16e performs the first operation data clear indication act. Subsequently, the steps are continuously performed up to the last step.

As explained above, when transmitting the first operation data to the first robot 6 and when transmitting the second operation data to the first robot 6, the wireless LAN slave set 31 transmits, to the first robot 6, the first identification act instruction signal for causing the first robot 6 to perform the first identification act. When transmitting the first operation data to the second robot 7 and when transmitting the second operation data to the second robot 7, the wireless LAN slave set 31 transmits, to the second robot 7, the second identification act instruction signal for causing the second robot 7 to perform the second identification act.

In the robot system 1 and the control method performed by the robot system 1, even if the operation data 37 received by the robots 11 changes, the robots 11 perform the same identification act. At this time, the operator can easily memorize a relation between the identification act and the robots 11. Therefore, even if the operation data 37 received by the robots 11 changes, it is possible to reduce wrong recognition of the robots 11 by the operator.

Fourth Embodiment

A fourth embodiment of the robot system is explained with reference to FIGS. 25 and 26. This embodiment is different from the first embodiment in that the same identification act instruction signal and the same operation data clear indication instruction signal are transmitted to the first robot 6 and the second robot 7. Explanation is omitted concerning similarities to the first embodiment.

Figure 25:
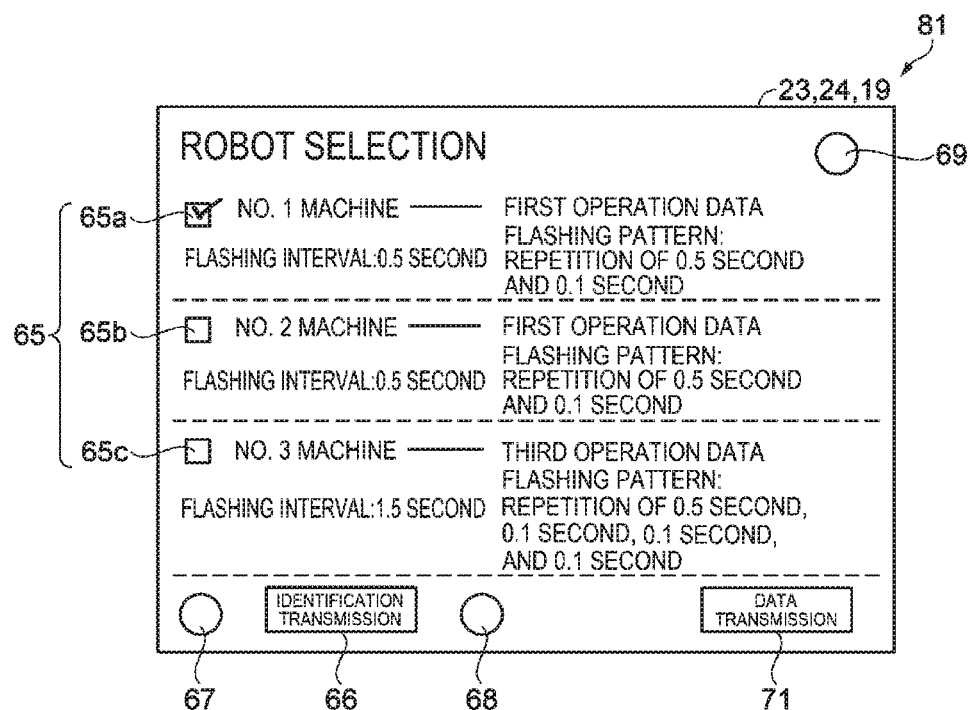
FIG. 25 is a schematic diagram for explaining a control method by a robot system according to a fourth embodiment.
Figure 26:
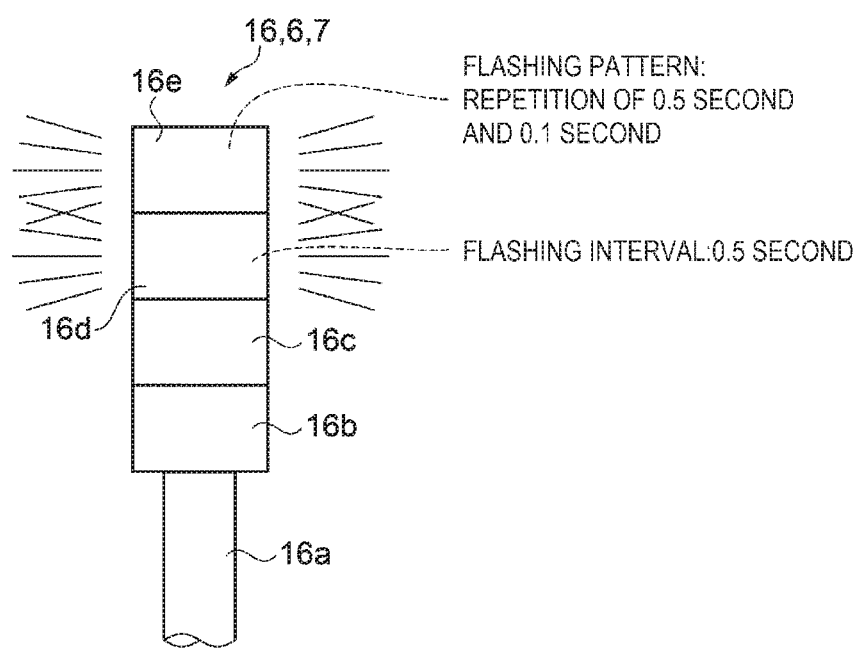
FIG. 26 is a schematic diagram for explaining the control method by the robot system.

FIGS. 25 and 26 are schematic diagrams for explaining a control method by the robot system. FIG. 25 is a diagram corresponding to the robot and operation data displaying step of step S1 and the transmission-target-robot selecting step of step S2. As shown in FIG. 25, in a robot system 81, in step S2, the identification act data 36 and the operation data 37 are displayed on the display section 23.

The operation data 37 transmitted to the first robot 6 and the operation data 37 transmitted to the second robot 7 are the same first operation data. The identification act data transmitted to the first robot 6 and the identification act data transmitted to the second robot 7 have the same content. In other words, a flashing interval indicated by the first identification act data and the second identification act data is 0.5 second.

The operator touches the first selection field 65a. Subsequently, the operator touches the identification transmission button 66. In the teaching device 19, the touch pad 24 receives selection of the identification transmission button 66. Subsequently, the robot system 81 shifts to step S3.

In the identification-act-instruction-signal transmitting step of step S3, the teaching device 19 transmits the first identification act instruction signal and the first operation data clear indication instruction signal to the first robot 6. Subsequently, the robot system 81 shifts to step S4.

FIG. 26 is a diagram corresponding to the identification-act implementing step of step S4. As shown in FIG. 26, in the display lamp unit 16 of the first robot 6, the identification display light 16d performs the first identification act. In the display lamp unit 16 of the first robot 6, the operation-data display light 16e performs the first operation data clear indication act. Subsequently, the robot system 81 shifts to step S2 through step S5, step S6, step S8, and step S1.

In the transmission-target-robot selecting step of step S2, the operator touches the second selection field 65b. Subsequently, the operator touches the identification transmission button 66. In the teaching device 19, the touch pad 24 receives selection of the identification transmission button 66. Subsequently, the robot system 81 shifts to step S3.

In the identification-act-instruction-signal transmitting step of step S3, the transmission and reception control section for teaching 43 generates an identification act instruction signal. In this embodiment, the identification act instruction signal transmitted to a transmission target robot to which the first operation data is planned to be transmitted is referred to as first identification act instruction signal. The identification act instruction signal transmitted to a transmission target robot to which the second operation data is planned to be transmitted is referred to as second identification act instruction signal.

The second identification act instruction signal is the same as the first identification act instruction signal. In other words, the teaching device 19 transmits the second identification act instruction signal, which is the same as the first identification act instruction signal transmitted to the first robot 6, and the first operation data clear indication instruction signal to the second robot 7. Subsequently, the robot system 81 shifts to step S4.

As shown in FIG. 26, in the identification-act implementing step of step S4, in the display lamp unit 16 of the second robot 7, the identification display light 16d performs the first identification act. In the display lamp unit 16 of the second robot 7, the operation-data display light 16e performs the first operation data clear indication act. Subsequently, the steps are continuously performed up to the last step.

As explained above, when the wireless LAN slave set 31 is planned to transmit the same operation data 37 to the first robot 6 and the second robot 7, the wireless LAN slave set 31 transmits the identification act instruction signal for causing the first robot 6 and the second robot 7 to perform the same identification act.

With the robot system 81 and the control method by the robot system 81, the teaching device 19 transmits the same operation data 37 to the plurality of robots 11. At this time, the teaching device 19 transmits, to the robots 11, to which the same operation data 37 is planned to be transmitted, the identification act instruction signal for causing the robots 11 to perform the same identification act. The robots 11, which receive the identification act instruction signal, perform the same identification act. Therefore, when the same operation data 37 is transmitted to the plurality of robots 11, the operator can easily confirm the robots 11 to which the same operation data 37 is planned to be transmitted.

Fifth Embodiment

Figure 27:
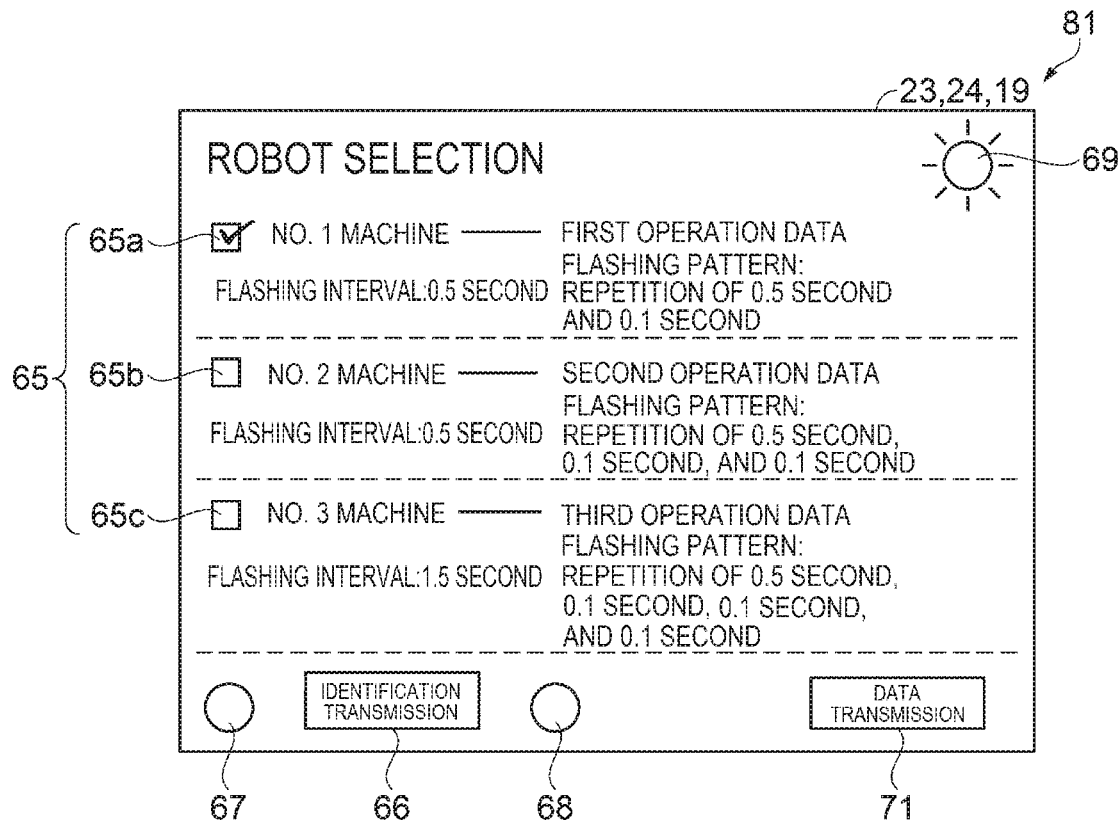
FIG. 27 is a schematic diagram for explaining a control method by a robot system according to a fifth embodiment.
Figure 28:
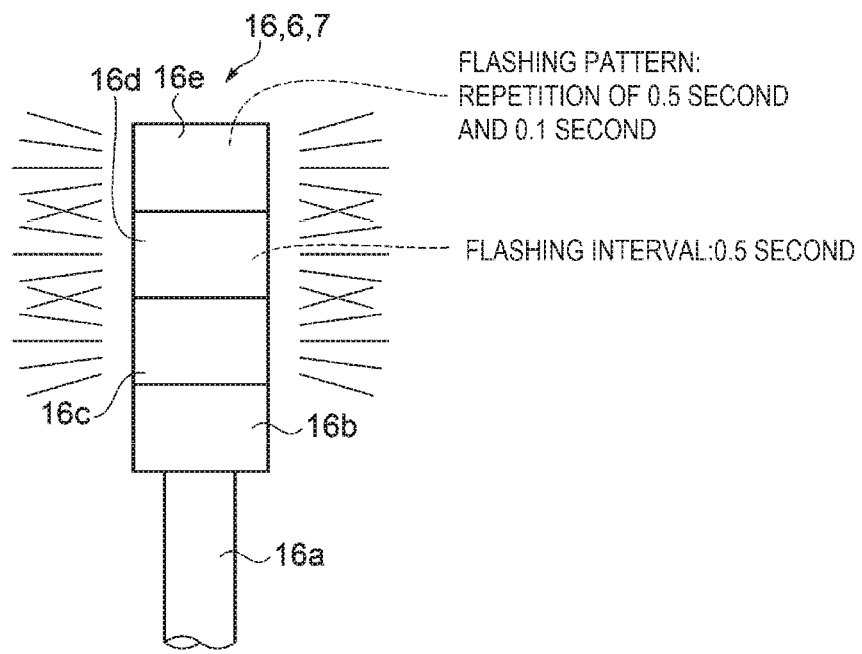
FIG. 28 is a schematic diagram for explaining the control method by the robot system.

A fifth embodiment of the robot system is explained with reference to FIGS. 27 and 28. FIGS. 27 and 28 are schematic diagrams for explaining a control method by the robot system. This embodiment is different from the fourth embodiment in that the same first operation data is transmitted to the first robot 6 and the second robot 7. Explanation is omitted concerning similarities to the fourth embodiment.

FIG. 27 is a schematic diagram for explaining a robot selection screen. In the robot system 81 in this embodiment, as shown in FIG. 27, the identification act data and the operation data are displayed on the display section 23 in the robot and operation data displaying step of step S1 and the transmission-target-robot selecting step of step S2.

The operation data 37 of the first robot 6, the second robot 7, and the third robot 8 are respectively first operation data, second operation data, and third operation data. The first operation data, the second operation data, and the third operation data are respectively different data. The operation data 37 transmitted to the robots 11 are different data. The first identification act data and the second identification act data are the same data. In other words, both of flashing intervals of the identification display light 16d in the first identification act data and the second identification act data are 0.5 second. At this time, since the operator cannot distinguish the robot 11 to which the first identification act data is transmitted and the robot 11 to which the second identification act data is transmitted even if the operator views the identification display light 16d, the operator is likely to mistake a transmission destination of the operation data 37.

In step S2, the operator touches the selection field 65a. Subsequently, the operator touches the identification transmission button 66. In the teaching device 19, the touch pad 24 receives selection of the identification transmission button 66.

In step S3, the transmission and reception control section for teaching 43 generates an identification act instruction signal. As in the fourth embodiment, the identification act instruction signal transmitted to the robot 11, to which the first operation data is planned to be transmitted, is referred to as first identification act instruction signal. The identification act instruction signal transmitted to the robot 11, to which the second operation data is planned to be transmitted, is referred to as second identification act instruction signal.

The transmission and reception control section for teaching 43 confirms that the operation data 37 transmitted to the first robot 6 and the operation data 37 transmitted to the second robot 7 are different. Since the first identification act data and the second identification act data are the same, the first identification act instruction signal and the second identification act instruction signal are the same signal. The transmission and reception control section for teaching 43 flashes the abnormality display section 69 to notify the operator that the first identification act instruction signal and the second identification act instruction signal are the same signal.

In other words, the operation data 37 transmitted to the first robot 6 and the operation data 37 transmitted to the second robot 7 are different operation data 37. At this time, as correct instruction signals, the first identification act instruction signal and the second identification act instruction signal are different identification act instruction signals. When the first identification act instruction signal and the second identification act instruction signal are the same identification act instruction signals, the first identification act instruction signal and the second identification act instruction signal are wrong instruction signals. Therefore, when the first identification act instruction signal and the second identification act instruction signal should be different but are the same, the teaching device 19 notifies the operator that the first identification act instruction signal and the second identification act instruction signal are the same.

FIG. 28 is a diagram corresponding to the identification-act implementing step of step S4. As shown in FIG. 28, in the display lamp unit 16 of the first robot 6, the identification display light 16d performs the first identification act. In the display lamp unit 16 of the first robot 6, the operation-data display light 16e performs the first operation data clear indication act. Further, the abnormality display light 16c flashes to notify the operator that the first identification act instruction signal and the second identification act instruction signal are the same.

When the first operation data and the third operation data are different and the first identification act instruction signal and the third identification act instruction signal are the same, the abnormality displaying section 69 and the abnormality display light 16c flash. When the second operation data and the third operation data are different and the second identification act instruction signal and the third identification act instruction signal are the same, the abnormality display section 69 and the abnormality display light 16c flash.

In the robot system 81 and the control method by the robot system 81, when the teaching device 19 is about to transmit, to the plurality of robots 11, to which the different operation data 37 is planned to be transmitted, identification act instruction signals for causing the robots 11 to perform the same identification act, the teaching device 19 notifies the operator that the identification act instruction signals transmitted to the plurality of robots 11, to which the different operation data 37 is planned to be transmitted, are the same. When the plurality of robots 11, which are planned to receive the different operation data 37, perform the same identification act, the operator cannot identify operation data. At this time, the operator confirms content notified by the teaching device 19 and performs setting for causing the robots 11 to perform a different identification act for each of the operation data. As a result, since the robots 11, which receive the different operation data 37, respectively perform identification acts different from one another, the operator can identify the transmission target robot 11 to which the operation data is transmitted.

Embodiments of the present disclosure are not limited to the embodiments explained above. Various changes and improvements can be added to the embodiments by those having ordinary knowledge in the field within the technical idea of the present disclosure. Modifications are explained below.

Modification 1

In the first embodiment, the identification display light 16d flashes light to perform the identification act. The operation-data display light 16e flashes light to perform the operation data clear indication act. The identification display light 16d and the operation-data display light 16e may switch a plurality of kinds of wavelengths and emit light. A color of the light changes when the wavelength of the light changes. The color of the light may be changed for each of the indication acts. Further, the color of the light may be changed for each of operation data clear indication acts. The color and a flashing pattern of the light may be combined. The display lamp unit 16 can emit various light signals.

Besides, other methods may be used as the identification act and the operation data clear indication act. For example, speakers may be set in the robots 11 and sound may be emitted as the identification act and the operation data clear indication act. The sound emitted from the speakers may be voice for informing notification content. A tone interval of the sound emitted from the speakers may be changed. Besides, various melodies may be used as the sound emitted from the speakers.

Besides, as the identification act and the operation data clear indication act, the transmission target robot 11 may operate the arms 13 and the end effect 14. Movements and postures of the arms 13 and the end effector 14 may indicate the notification content, the identification act, and the operation data clear indication act.

Besides, displays may be set in the robots 11. As the identification act and the operation data clear indication act, the operation data 37 and the identification act data 36 may be displayed on the displays. When the methods explained above are used, the robots 11 can transmit a plurality of kinds of information to the operator.

Modification 2

In the first embodiment, one robot 11 is selected in the transmission-target-robot selecting step of step S2. A plurality of robots 11 may be selected and the identification act instruction signal and the operation data clear indication instruction signal may be simultaneously transmitted to the plurality of robots 11. It is possible to efficiently transmit the operation data 37.

Modification 3

In the first embodiment, the operation data clear indication act is performed by the operation-data display light 16e and the data-identification display section 68. The operation data clear indication act may be performed by only the operation-data display light 16e or may be performed by only the data-identification display section 68. When the operation date display light 16e is not set, the configuration of the display lamp unit 16 can be simplified. When the data-identification display section 68 is not set, the configuration of the teaching device 19 can be simplified.

Modification 4

In the first embodiment, the identification act is performed by the identification display light 16d and the robot-identification display section 67. The identification act may be performed by only the identification display light 16d or may be performed by only the robot-identification display section 67. When the identification display light 16d is not set, the configuration of the display lamp unit 16 can be simplified. When the robot-identification display section 67 is not set, the configuration of the teaching device 19 can be simplified.

Modification 5

In the first embodiment, as shown in FIG. 2, the control device 15 is incorporated in the first robot 6. The control device 15 may be circumscribed with the first robot 6 by a cable or the like. A control device having the same configuration as the configuration of the control device 15 may be included in at least one of the second robot 7 and the third robot 8. Besides, control of the respective operations and the like of the first robot 6, the second robot 7, and the third robot 8 may be performed by one control device 15. Consequently, it is possible to improve the versatility of the control device 15.

The contents of the modifications 1 to 4 may be applied to the second to fifth embodiments.

Contents derived from the embodiments are described below.

A control method by a robot system is a control method by a robot system including a plurality of robots and a teaching device connected to the plurality of robots via a network. The teaching device transmits, to an identification act execution robot among the plurality of robots, an identification act instruction signal for causing the identification act execution robot to perform an identification act of identifying a transmission target robot to which operation data is planned to be transmitted among the plurality of robots; the identification act execution robot, which receives the identification act instruction signal, performs the identification act; and, after the identification act execution robot performs the identification act, when the identification act execution robot and the transmission target robot are the same, the teaching device transmits the operation data to the transmission target robot.

With this method, the robot system includes the teaching device and the plurality of robots. The plurality of robots are connected to the teaching device via the network. The teaching device stores identification act data and the operation data in the robots. The identification act data is data of an identification act for identifying the robots. An operator views the identification act and identifies the robots. The operation data is data indicating operations performed by the robots. The operation data includes data indicating moving points of a robot arm and a program indicating moving procedures for the robot arm.

The operator confirms content of the identification act performed by a robot planned to receive predetermined operation data. The teaching device transmits the identification act instruction signal to the identification act execution robot. The identification act execution robot, which receives the identification act instruction signal, performs the identification act. The identification act indicates that the identification act execution robot performs an act that the operator can confirm with a visual sense, an auditory sense, or the like. The identification act includes the identification act execution robot operating an arm or the like.

The operator recognizes operation contents performed by the robots. Further, the operator recognizes correspondence between the identification act data and the operation data. The operator confirms which identification act execution robot among the plurality of robots receives the identification act instruction signal and is performing the identification act. The operator confirms whether the identification act execution robot, which is performing the identification act, is a target to which the operation data is transmitted.

Subsequently, the operator inputs, to the teaching device, a result of selection about whether to transmit the operation data to the robot, which is performing the identification act. When the teaching device receives the input indicating that the operation data is transmitted, the teaching device transmits the operation data to the robot, which is performing the identification act. In this way, the operator confirms the robot, to which the operation data is transmitted, using the identification act and the content displayed on the teaching device. As a result, it is possible to reduce wrong transmission of the operation data to a robot to which the operation data is not planned to be transmitted.

In the control method by the robot system, the teaching device may further transmit, in addition to the identification act instruction signal, an operation data clear indication instruction signal indicating the operation data to the identification act execution robot, and the identification act execution robot, which receives the operation data clear indication instruction signal, may further perform, in addition to the identification act, an operation data clear indication act based on the operation data clear indication instruction signal.

With this method, the teaching device transmits the identification act instruction signal and the operation data clear indication instruction signal to the robot, which executes the identification act. The robot, which executes the identification act, receives the operation data clear indication instruction signal. The robot, which executes the identification act, performs the identification act and the operation data clear indication act. The operator confirms the operation data planned to be transmitted to the robot, which executes the identification act. Therefore, the operator can confirm the target robot to which the operation data is transmitted among the plurality of robots and confirm the operation data transmitted to the robot.

In the control method by the robot system, light may be emitted from the identification act execution robot in the identification act.

With this method, light is emitted in the identification act. At this time, light flashing in a plurality of kinds of patterns is emitted or a plurality of kinds of wavelengths are switched to emit light. Consequently, the identification act execution robot can perform a plurality of kinds of identification acts.

A robot system is a robot system that performs data transmission and reception between a plurality of robots and a teaching device connected to the plurality of robots via a network. The teaching device includes: a display section configured to display identification act data indicating an identification act of identifying a transmission target robot to which operation data is planned to be transmitted among the plurality of robots and the operation data indicating operation content of the robot; and a transmitting section configured to transmit, to an identification act execution robot among the plurality of robots, an identification act instruction signal for causing the identification act execution robot to perform the identification act and transmit the operation data to the transmission target robot. The robot includes: a receiving section configured to receive the identification act instruction signal and the operation data; and an identification act section configured to perform the identification act when the receiving section receives the identification act instruction signal.

With this configuration, the robot system includes the teaching device and the plurality of robots. The plurality of robots are connected to the teaching device via the network. The display section displays identification act data and the operation data in the robots. The identification act data is data of an identification act for identifying the robots. An operator views the identification act and identifies the robots. The operation data is data indicating operations performed by the robots. The operation data includes data indicating moving points of a robot arm and a program indicating moving procedures for the robot arm.

The operator selects a transmission target robot and inputs information indicating the selected transmission target robot to the input section of the teaching device. The transmission target robot is a robot at a transmission destination of the operation data. When the information indicating the transmission target robot is input to the input section, the transmitting section transmits the identification act instruction signal to the transmission target robot.

The robot includes the receiving section and the identification act section. The receiving section receives the identification act instruction signal. In the robot, which receives the identification act instruction signal, the identification act section performs the identification act. The identification act indicates that the identification act execution robot performs an act that the operator can confirm with a visual sense, an auditory sense, or the like. The identification act includes the transmission target robot operating an arm or the like.

In the teaching device, the display section displays an identification name of operation data planned to be transmitted to the transmission target robot. The operator confirms the displayed identification name of the operation data to thereby confirm the operation data planned to be transmitted to the transmission target robot. The operator confirms the identification act and confirms the entity of the identification act execution robot and the operation data planned to be transmitted to the identification act execution robot. The operator selects whether to transmit, to the identification act execution robot, the operation data planned to be transmitted to the transmission target robot.

The operator inputs, to the input section of the teaching device, a result of the selection about whether to transmit the operation data to the identification act execution robot. When the selection to transmit the operation data is input to the input section, the transmission control section causes the transmitting section of the teaching device to transmit the operation data to the identification act execution robot. The transmission target robot receives the operation data. Since the robot, to which the operation data is transmitted, is confirmed by the identification act in this way, it is possible to reduce wrong transmission of the operation data by the teaching device to the robot to which the operation data is not planned to be transmitted.

In the robot system, the robot may include an operation clear indication act section configured to perform an operation data clear indication act of indicating the operation data, the transmitting section may transmit an operation data clear indication instruction signal indicating the operation data to the identification act execution robot in addition to the identification act instruction signal, the receiving section may receive the operation data clear indication instruction signal, and the operation clear indication act section may perform the operation data clear indication act.

With this configuration, the transmitting section transmits the identification act instruction signal and the operation data clear indication instruction signal to the identification act execution robot. In the identification act execution robot, the receiving section receives the data clear indication instruction signal. The transmission target robot performs the identification act and the operation data clear indication act. The operator confirms the operation data planned to be transmitted to the transmission target robot. Therefore, the operator can confirm the target robot to which the operation data is transmitted among the plurality of robots and confirm the operation data transmitted to the robot.

In the robot system, the identification act section may emit light in the identification act.

With this configuration, light is emitted in the identification act. At this time, light flashing in a plurality of kinds of patterns is emitted or a plurality of kinds of wavelengths are switched to emit light. Consequently, the identification act execution robot can perform a plurality of kinds of identification acts.

In the control method by the robot system, the plurality of robots may include a first robot and a second robot, the operation data may include first operation data and second operation data, the identification act may include a first identification act and a second identification act, when transmitting the first operation data or the second operation data to the first robot, the teaching device may transmit, to the first robot, a first identification act instruction signal for causing the first robot to perform the first identification act in both a case in which the first operation data is transmitted and a case in which the second operation data is transmitted, and, when transmitting the first operation data or the second operation data to the second robot, the teaching device may transmit, to the second robot, a second identification act instruction signal for causing the second robot to perform the second identification act in both a case in which the first operation data is transmitted and a case in which the second operation data is transmitted.

With this method, irrespective of content of the operation data transmitted to the first robot, the teaching device transmits, to the first robot, the identification act instruction signal for causing the first robot to perform the first identification act. Similarly, irrespective of content of the operation data transmitted to the second robot, the teaching device transmits, to the second robot, the identification act instruction signal for causing the second robot to perform the second identification act. Accordingly, the same robot performs the same identification act irrespective of content of the operation data that the robot receives. At this time, the operator can easily memorize a robot corresponding to the identification act. Therefore, even if operation data received by a predetermined robot changes, it is possible to reduce wrong recognition of the robot by the operator.

In the control method by the robot system, when the first identification act instruction signal and the second identification act instruction signal should be different but are the same, the teaching device may notify that the first identification act instruction signal and the second identification act instruction signal are the same.

With this method, although the teaching device is planned to cause the plurality of robots to perform different identification acts, when the teaching device is about to transmit, to the plurality of robots, the identification act instruction signals for causing the plurality of robots to perform the same identification act, the teaching device notifies that the identification act instruction signals transmitted to the plurality of robots are the same. When the plurality of robots perform the same identification act, the operator cannot identify the robots. At this time, the operator confirms content notified by the teaching device and performs setting for causing the each of the robots to perform a different identification act. As a result, since the plurality of robots respectively perform different identification acts, the operator can identify the transmission target robot.

In the control method by the robot system, the plurality of robots may include a first robot and a second robot, and, when the teaching device is planned to transmit same operation data to the first robot and the second robot, the teaching device may transmit, to the first robot and the second robot, the identification act instruction signal for causing the first robot and the second robot to perform same identification act.

With this method, the teaching device sometimes transmits the same operation data to the plurality of robots. At this time, the teaching device transmits, to the robots, to which the same operation data is planned to be transmitted, the identification act instruction signal for causing the robots to perform the same identification act. The robots, which receive the identification act instruction signal, perform the same identification act. Therefore, when the same operation data is transmitted to the plurality of robots, the operator can easily confirm the robots, to which the same operation data is planned to be transmitted.

In the control method by the robot system, the operation data may include first operation data and second operation data different from the first operation data, when the identification act instruction signal transmitted to the transmission target robot, to which the first operation data is planned to be transmitted, is represented as a first identification act instruction signal and the identification act instruction signal transmitted to the transmission target robot, to which the second operation data is planned to be transmitted, is represented as a second identification act instruction signal and the first identification act instruction signal and the second identification act instruction signal should be different but the first identification act instruction signal and the second identification act instruction signal are the same, the teaching device may notify that the first identification act instruction signal and the second identification act instruction signal are the same.

With this method, when the teaching device is about to transmit, to the plurality of robots, to which different operation data is planned to be transmitted, the identification act instruction signals for causing the plurality of robots to perform the same identification act, the teaching device notifies the operator that the identification act instruction signals transmitted to the plurality of robots, to which the different operation data is planned to be transmitted, are the same. When the plurality of robots planned to receive the different operation data perform the same identification act, the operator cannot identify the operation data. At this time, the operator confirms content notified by the teaching device and performs setting for causing the robots to perform a different identification act for each of the operation data. As a result, since the robots, which receive the different operation data, respectively perform different identification acts, the operator can identify transmission target robot to which the operation data is transmitted.

In the robot system, the plurality of robots may include a first robot and a second robot, the operation data may include first operation data and second operation data, the identification act may include a first identification act and a second identification act, when transmitting the first operation data or the second operation data to the first robot, the transmitting section may transmit, to the first robot, a first identification act instruction signal for causing the first robot to perform the first identification act in both a case in which the first operation data is transmitted and a case in which the second operation data is transmitted, and, when transmitting the first operation data or the second operation data to the second robot, the transmitting section may transmit, to the second robot, a second identification act instruction signal for causing the second robot to perform the second identification act in both a case in which the first operation data is transmitted and a case in which the second operation data is transmitted.

With this configuration, irrespective of content of the operation data transmitted to the first robot, the teaching device transmits, to the first robot, the identification act instruction signal for causing the first robot to perform the first identification act. Similarly, irrespective of content of the operation data transmitted to the second robot, the teaching device transmits, to the second robot, the identification act instruction signal for causing the second robot to perform the second identification act. Accordingly, the same robot performs the same identification act irrespective of content of the operation data that the robot receives. At this time, the operator can easily memorize relation between the identification acts and the robots. Therefore, even if operation data received by a predetermined robot changes, it is possible to reduce wrong recognition of the robot by the operator.

The robot system may include an abnormality notifying section configured to notify that the robot system is in an abnormal state and, when the first identification act instruction signal and the second identification act instruction signal are the same, the abnormality notifying section may notify that the first identification act instruction signal and the second identification act instruction signal are the same.

With this configuration, when the teaching device is about to transmit, to the plurality of robots, the identification act instruction signals for causing the plurality of robots to perform the same identification act, the teaching device notifies that the identification act instruction signals transmitted to the plurality of robots are the same. When the plurality of robots perform the same identification act, the operator cannot identify the robots. At this time, the operator confirms content notified by the abnormality notifying section and performs setting for causing the each of the robots to perform a different identification act. As a result, since the plurality of robots respectively perform different identification acts, the operator can identify the transmission target robot.

In the robot system, the plurality of robots may include a first robot and a second robot, and, when the transmitting section is planned to transmit same operation data to the first robot and the second robot, the transmitting section may transmit, to the first robot and the second robot, the identification act instruction signal for causing the first robot and the second robot to perform same identification act.

With this configuration, the teaching device sometimes transmits the same operation data to the plurality of robots. At this time, the teaching device transmits, to the robots, to which the same operation data is planned to be transmitted, the identification act instruction signal for causing the robots to perform the same identification act. The robots, which receive the identification act instruction signal, perform the same identification act. Therefore, when the same operation data is transmitted to the plurality of robots, the operator can easily confirm the robots, to which the same operation data is planned to be transmitted.

The robot system may include an abnormality notifying section configured to notify that the robot system is in an abnormal state and, the operation data includes the first operation data and the second operation data different from the first operation data. When the identification act instruction signal transmitted to the transmission target robot, to which the first operation data is planned to be transmitted, is represented as a first identification act instruction signal and the identification act instruction signal transmitted to the transmission target robot, to which the second operation data is planned to be transmitted, is represented as a second identification act instruction signal and the first identification act instruction signal and the second identification act instruction signal are the same, the abnormality notifying section may notify that the first identification act instruction signal and the second identification act instruction signal are the same.

With this configuration, when the teaching device is about to transmit, to the plurality of robots, to which different operation data is planned to be transmitted, the identification act instruction signals for causing the plurality of robots to perform the same identification act, the teaching device notifies that the identification act instruction signals transmitted to the plurality of robots, to which the different operation data is planned to be transmitted, are the same. When the plurality of robots planned to receive the different operation data perform the same identification act, the operator cannot identify the operation data. At this time, the operator confirms content notified by the abnormality notifying section and performs setting for causing the robots to perform a different identification act for each of the operation data. As a result, since the plurality of robots respectively perform different identification acts, the operator can identify transmission target robot to which the operation data is transmitted.

What is claimed is:

1. A control method by a robot system including a plurality of robots and a teaching device connected to the plurality of robots via a network, the control method comprising:

the teaching device transmitting, to an identification act execution robot among the plurality of robots, an identification act instruction signal for causing the identification act execution robot to perform an identification act of identifying a transmission target robot to which operation data is planned to be transmitted among the plurality of robots;

the identification act execution robot, which receives the identification act instruction signal, performing the identification act; and after the identification act execution robot performs the identification act, when the identification act execution robot and the transmission target robot are the same, the teaching device transmitting the operation data to the transmission target robot.

2. The control method by the robot system according to claim 1, wherein the teaching device further transmits an operation data clear indication instruction signal indicating the operation data to the identification act execution robot, and the identification act execution robot, which receives the operation data clear indication instruction signal, further performs an operation data clear indication act based on the operation data clear indication instruction signal.

3. The control method by the robot system according to claim 1, wherein light is emitted from the identification act execution robot in the identification act.

4. The control method by the robot system according to claim 2, wherein light is emitted from the identification act execution robot in the identification act.

5. A robot system that performs data transmission and reception between a plurality of robots and a teaching device connected to the plurality of robots via a network, wherein the teaching device includes:

a display section configured to display identification act data indicating an identification act of identifying a transmission target robot to which operation data is planned to be transmitted among the plurality of robots and the operation data indicating operation content of the robot; and a transmitting section configured to transmit, to an identification act execution robot among the plurality of robots, an identification act instruction signal for causing the identification act execution robot to perform the identification act and transmit the operation data to the transmission target robot, and the robot includes:
a receiving section configured to receive the identification act instruction signal and the operation data; and
an identification act section configured to perform the identification act when the receiving section receives the identification act instruction signal.

6. The robot system according to claim 5, wherein
the robot includes an operation clear indication act section configured to perform an operation data clear indication act of indicating the operation data,
the transmitting section further transmits an operation data clear indication instruction signal indicating the operation data to the identification act execution robot,
the receiving section receives the operation data clear indication instruction signal, and
the operation clear indication act section performs the operation data clear indication act.

7. The robot system according to claim 5, wherein the identification act section emits light in the identification act.

8. The robot system according to claim 6, wherein the identification act section emits light in the identification act.

* * * * *